(12) United States Patent
Islim et al.

(10) Patent No.: US 11,190,274 B2
(45) Date of Patent: Nov. 30, 2021

(54) COMMUNICATION SCHEME FOR INTENSITY MODULATED SYSTEMS

(71) Applicant: The University Court of the University of Edinburgh, Edinburgh (GB)

(72) Inventors: Mohamed Sufyan Islim, Edinburgh (GB); Harald Haas, Edinburgh (GB)

(73) Assignee: THE UNIVERSITY COURT OF THE UNIVERSITY OF EDINBURG, Edinburgh (GB)

( * ) Notice: Subject to any disclaimer, the term of this patent is extended or adjusted under 35 U.S.C. 154(b) by 0 days.

(21) Appl. No.: 16/304,091

(22) PCT Filed: May 22, 2017

(86) PCT No.: PCT/GB2017/051423
§ 371 (c)(1),
(2) Date: Nov. 21, 2018

(87) PCT Pub. No.: WO2017/203221
PCT Pub. Date: Nov. 30, 2017

(65) Prior Publication Data
US 2019/0253148 A1    Aug. 15, 2019

(30) Foreign Application Priority Data
May 23, 2016    (GB) .................................... 1609025

(51) Int. Cl.
*H04B 10/04*    (2006.01)
*H04B 10/516*    (2013.01)
(Continued)

(52) U.S. Cl.
CPC ......... *H04B 10/5161* (2013.01); *H04B 10/11* (2013.01); *H04B 10/114* (2013.01); *H04B 10/548* (2013.01)

(58) Field of Classification Search
CPC .. H04B 10/5161; H04B 10/11; H04B 10/114; H04B 10/548; H04B 10/508;
(Continued)

(56) References Cited

U.S. PATENT DOCUMENTS

| | | | | |
|---|---|---|---|---|
| 5,166,924 A | * | 11/1992 | Moose | H04L 27/2602 370/289 |
| 6,445,476 B1 | * | 9/2002 | Kahn | G02F 1/0327 359/245 |

(Continued)

FOREIGN PATENT DOCUMENTS

| | | |
|---|---|---|
| CN | 102244635 A | 11/2011 |
| CN | 102684819 A | 9/2012 |
| WO | WO-2015036786 A1 * | 3/2015 |

OTHER PUBLICATIONS

Islim et al., "Augmenting the spectral efficiency of enhanced PAM-DMT-based optical wireless communications," Opt. Express 24, 11932-11949 (2016).

(Continued)

*Primary Examiner* — Hibret A Woldekidan
(74) *Attorney, Agent, or Firm* — Patent Law Works

(57) ABSTRACT

A processing system for a transmission apparatus, and an associated transmission apparatus and method, the processing system being configured to produce or generate a transmission signal representative of an original signal comprising data portions; the data being carried by or comprised in waveforms or streams in the transmission signal; the processing system being configured to generate the respective waveforms or streams by loading the data onto selected data symbols or subcarriers in the frequency domain to form the transmission signal.

27 Claims, 11 Drawing Sheets

(51) Int. Cl.
H04B 10/114 (2013.01)
H04B 10/548 (2013.01)
H04B 10/11 (2013.01)

(58) Field of Classification Search
CPC .... H04B 10/5055; H04B 10/61; H04B 10/58; H04B 10/505; H04B 10/2575; H04B 10/671; H04B 10/2525; H04B 10/503; H04J 14/0298; H04L 27/2096; H04L 27/00; H04L 27/2628; H04L 27/2637; H04L 27/2653; H04L 27/2697; H04L 27/2623; H04L 27/2614; H04L 27/2621; H04L 27/2624; G01S 17/10
USPC ....... 398/183, 185, 187, 189, 193, 194, 202, 398/208, 158, 159
See application file for complete search history.

(56) References Cited

U.S. PATENT DOCUMENTS

| | | | | |
|---|---|---|---|---|
| 6,490,069 | B1* | 12/2002 | Kahn | H04B 10/25137 398/183 |
| 7,944,313 | B1* | 5/2011 | Ying | G11B 5/09 331/1 A |
| 8,155,529 | B2* | 4/2012 | Rhee | H04B 10/548 398/140 |
| 2002/0097473 | A1* | 7/2002 | McKiel, Jr. | H04J 14/0298 398/141 |
| 2002/0176509 | A1 | 11/2002 | Gatherer et al. | |
| 2003/0011854 | A1* | 1/2003 | Kahn | H04B 10/63 398/141 |
| 2007/0092264 | A1 | 4/2007 | Suzuki et al. | |
| 2011/0085065 | A1* | 4/2011 | Egawa | H04N 5/378 348/294 |
| 2012/0250750 | A1* | 10/2012 | Mishra | H04L 27/0014 375/226 |
| 2013/0136449 | A1* | 5/2013 | Liu | H04B 10/25137 398/65 |
| 2013/0336654 | A1* | 12/2013 | Arikawa | H04J 14/06 398/65 |
| 2014/0355407 | A1* | 12/2014 | Cronie | H04B 3/32 370/201 |
| 2015/0104181 | A1* | 4/2015 | Mazurczyk | H04B 10/516 398/115 |
| 2016/0226594 | A1* | 8/2016 | Haas | H04B 10/60 |

OTHER PUBLICATIONS

Islim et al., "Spectrally enhanced PAM-DMT for IM/DD optical wireless communications", 2015 IEEE 26th Annual International Symposium on Personal, Indoor, and Mobile Radio Communications (PIMRC), Hong Kong, 2015, pp. 877-882.

Islim et al., "On the superposition modulation for OFDM-based optical wireless communication," 2015 IEEE Global Conference on Signal and Information Processing (GlobalSIP), Orlando, FL, 2015, pp. 1022-1026.

International Search Report and Written Opinion issued for PCT/US2018/050507, dated Sep. 1, 2017, 12 pages.

Tomoyuki Kozu, et al.. Proposal for Superposed ACO-OFDM using Several Even Subcarriers, 2015 9th ICSPCS, Jan. 28, 2016.

Bilal Ranjha, et al., Hybrid Asymmetrically Clipped OFDM-Based IM/DDOptical Wireless System, IEEE/OSA Journal of Dptical Communications and Networking, vol. 6, Issue: 4,2014.

Japanese Office Action dated Jun. 22, 2021 for JP Application No. 2018-561525, with English translation, 8 pgs.

Chinese Office Action dated Aug. 19, 2021 for CN Application No. 201780045625.1 (Chinese), 9 pgs.

* cited by examiner

COMMUNICATION SCHEME FOR INTENSITY MODULATED SYSTEMS

FIELD

The present invention relates to a communication system for transmitting unipolar signals, along with an associated transmitter, receiver and methods of transmitting and receiving unipolar signals.

BACKGROUND

Optical wireless communication is considered to be a promising alternative or complimentary technology for addressing the increasing demand for wireless data communication traffic and the bandwidth limitation with current mobile communications systems.

Optical wireless communication can advantageously use low cost front end components such as light emitting diodes (LEDs) and photodiodes (PDs). However, LEDs generally emit light incoherently such that phase and amplitude are difficult to reliably modulate or detect. As such, optical wireless communications systems are often realised as intensity modulation/direct detection systems that may employ, for example, techniques such as on-off keying (OOK), pulse position modulation (PPM) and pulse amplitude modulation (M-PAM).

However, as transmission rates increase, inter-symbol interference may become increasingly problematic. In such circumstances, it would be beneficial to employ a modulation scheme more akin to orthogonal frequency division multiplexing (OFDM). However, OFDM generally produces complex valued time domain samples, whereas intensity modulation requires real unipolar signals.

The conventional way to create real signals is to impose a Hermitian symmetry during an inverse fast Fourier transform step in the modulation process. An alternative approach is to make a complex signal in the time domain real by splitting the real and the imaginary parts and transmitting them in two separate streams.

Once the signal is made real, the bipolar signal can be converted into a unipolar signal. A number of approaches for obtaining a unipolar signal that is suitable for use in optical wireless communications systems have been proposed. One approach is to use DC-biased optical OFDM (DCO-OFDM) which involves adding a bias value to all of the samples, wherein the bias value is sufficient to make all of the samples non-negative. However, this approach significantly increases the power dissipation of the signal. Some other examples of techniques that provide a unipolar signal include unipolar orthogonal frequency division multiplexing (U-OFDM), asymmetrically clipped optical OFDM (ACO-OMM), pulse amplitude modulated discrete multi-tone modulation (PAM-DMT), Flip-OFDM and the like. U-OFDM is described in published Patent applications GB2496379 and WO2013/064835 and in "Novel Unipolar Orthogonal Frequency Division Multiplexing" by D. Tsonev, S. Sinanović and H. Haas, *Proc. Of the Vehicular Technology Conference (VIC Spring)*, IEEE, Yokohama, Japan, IEEE, May 6-9 2012. ACO-OFDM is described by J. Armstrong et. al. in "Power efficient Optical OFDM", *Electronics Letters*, vol. 42, no. 6, pp. 370-372, 16 Mar. 2006. PAM-DMT is described by S. C. J. Lee et. al. in "PAM-DMT for Intensity Modulated and Direct-Detection Optical Communication Systems", *IEE Photonics Technology Letters*, Vol. 21, no. 23, pp. 1749-1751, December 2009. Flip-OFDM is described by N. Fernando et. al. in "Flip-OFMM for Optical Wireless Communications" in *Information Theory Workshop (ITW)*, IEEE, Paraty, Brazil: IEEE, Oct. 16-20, 2011, pp. 5-9. The contents of all of the above documents are hereby incorporated by reference in their entirety as if set out in full in the present application.

As indicated above, it is known to apply Hermitian symmetry to a block of symbols from a conventional modulation scheme at the transmitter side before applying an inverse fast Fourier transform. This effectively maps the original symbols to different carriers in the frequency domain of the resulting signal. Since Hermitian symmetry is applied, the inverse fast Fourier transform produces a real, bipolar signal. The time domain signal can then be subjected to a transformation in order to make it unipolar.

Although the U-OFDM, ACO-OFDM, PAM-DMT and Flip-OFDM schemes are all capable of much greater power efficiency than the DCO-OFDM scheme, the spectral efficiency of these methods is halved when compared with DCO-OFDM.

As such, it would be beneficial to have a transmission scheme that transmits data in a unipolar signal, such that it is usable with optical wireless communications or other techniques that require or benefit from unipolar signals, but at the same time achieves both a good spectral efficiency and good power efficiency.

It is at least one object of at least one embodiment of the present invention to provide an alternative or an improvement to the prior art and/or solve at least one problem with the prior art.

SUMMARY

According to an aspect of the present invention is a transmission apparatus or a processing system for a transmission apparatus configured to produce and/or transmit a transmission signal, such as a unipolar signal, representative of an original signal comprising data. The data may be carried by or comprised in waveforms or streams in the transmission signal. The transmission apparatus or a processing system may be configured to generate the respective waveforms or streams by loading the data onto selected data symbols and/or subcarriers in the frequency domain to form the transmission signal.

The transmission apparatus or a processing system may be configured to generate the respective waveforms or streams using an algorithm, index or grammar operating in the frequency domain to load the selected data symbols and/or subcarriers with data to form the transmission signal.

The transmission apparatus or a processing system may be configured to clip the waveforms or streams, e.g. to form clipped waveforms or streams. The transmission apparatus or a processing system may be configured to superimpose the clipped waveforms or streams, e.g. to form the transmission signal.

It will be appreciated from the above that the formation of the waveforms or streams is carried out in the frequency domain. However, the superposition of the waveforms or streams (e.g. the clipped waveforms or streams) in order to form the transmission signal may be carried out the time domain.

For example, the transmission apparatus or the processing system may be configured to produce, generate and/or transmit a unipolar transmission signal representative of an original bipolar signal comprising data.

The waveforms or streams may be arranged such that the data is obtainable, recoverable and/or extractable from the waveforms or streams. The transmission apparatus may be configured to transmit at least two, e.g. three or more superimposed waveforms or streams. The transmission apparatus may be configured to transmit up to seven, five, four, three or less information streams and/or associated waveforms or streams. Although the transmission apparatus may be configured to transmit any number of superimposed streams or waveforms, the range from two to seven superimposed streams or waveforms may represent a beneficial compromise of computational complexity, capacity and efficiency, which may depend on the application for which the transmission apparatus or a processing system is being used, and/or other factors. The transmission apparatus may be configured to concurrently transmit the one or more information streams and at least one other information stream.

Each waveform or stream may comprise and/or be formed from data symbols provided on selected subcarriers. The data symbols may be representative of data of the original signal. The data symbols may be or comprise modulation symbols, such as M-ary pulse-amplitude modulation (M-PAM) or M-QAM symbols. Each waveform or stream may comprise different selected subcarriers, e.g. the subcarriers of each waveform or stream may be mutually exclusive. The selection (e.g. different selections) of the subcarriers may define the different waveforms or streams. The different super-imposed waveforms or streams may be identified as a plurality of different depth waveforms or streams, which may comprise a first depth or depth 1 waveform or stream, a second depth or depth 2 waveform or stream, and so on until a required number of waveforms or streams to carry all of the data portions of the original signal has been met.

Each waveform or stream, e.g. at each depth, may have a different data capacity. The depth of the waveform or stream may be inversely related to the data capacity of the stream, for example, the depth 1 or first depth waveform may have the largest data capacity, the depth 2 or second depth waveform or stream may have the next largest data capacity and so on. As indicated above, although any number of superimposed waveforms or streams can be used, and although the optimum number of streams may vary depending on the application, generally the superimposed waveform or stream may beneficially comprise between 2 and 7, and preferably between 2 and 5 or between 2 and 4 super-imposed waveforms or streams, e.g. it may have a depth from 2 to 7, preferably from 2 to 5 or from to 4.

The subcarriers used to form, or that are comprised in, each waveform or stream may be selected such that there is no intra- and/or inter-waveform or stream interference, distortion and/or clipping distortion. For example, the subcarriers used to form, or that are comprised in, each waveform or stream may be selected such that there is no clipping distortion or inter-waveform or inter-stream interference with at least one or more or each other waveform or stream. The subcarriers used to form, or that are comprised in, each waveform or stream may be selected such that clipping distortion or interference due to at least one of the waveforms or streams (e.g. of the superimposed waveforms or streams) on at least one or each other of the waveforms or streams (e.g. of the superimposed waveforms or streams) does not adversely affect, and/or does not prohibit the reading and/or recovery of, the information carried by the at least one or each other of the waveforms or streams.

The selected data symbols and/or subcarriers in the frequency domain may be selected such that the distortion (e.g. clipping distortion) of at least one or each of the waveforms or streams falls on or into unused subcarriers.

The selected data symbols and/or subcarriers onto which data is loaded in the frequency domain to form at least one or each waveform or stream may be specified by an algorithm, index or grammar.

At least one of the waveforms or streams, e.g. a first depth waveform or stream, may comprise or be comprised of data symbols loaded only onto imaginary components of the sub-carriers. The real components of the subcarriers may be left unused by the first depth waveform or stream. The first depth waveform or stream may comprise a conventional PAM-DMT waveform or stream.

One or more of the waveforms or streams, such as waveforms or streams of a second and greater depth or a depth greater than the first depth, may comprise or be comprised of data symbols loaded only onto real components of the sub-carriers. The subcarriers other than those provided with symbols for a given waveform or stream may be left unused by that waveform or stream. The imaginary components components of the subcarriers may be left unused by the second and greater depth waveforms or streams. The second and greater depth waveforms or streams may comprise M-PAM modulated DMT waveforms or streams that may be superimposed.

Each of the waveforms or streams of the second and greater depth or depth greater than the first depth, e.g. the waveforms or streams that are formed or comprised of subcarriers having real symbols, may be formed or comprised of different subcarriers or combinations of subcarriers, which may be specified for each depth by the algorithm, index or grammar. At least one or each of the waveforms or streams, such as the waveforms or streams of the second and greater depth or depth greater than the first depth may be formed by or comprise symbols being provided only on subcarriers k', where $k'=2^{d-2}(2k+1)$, where d is the depth of the waveform or stream greater than the first depth (e.g. 2, 3 . . . etc.), and k is 0, 1, . . . , $N/2^d-1$ (where N is the number of subcarriers), e.g. according to the algorithm, index or grammar. The subcarriers other than those provided with symbols according to the algorithm, index or grammar may be left unused, empty or zero valued.

The symbols encoded onto the subcarriers for at least one or each waveform or stream may have Hermitian symmetry and/or anti-symmetry and/or symmetry, any or all of which may be in the time domain and/or the frequency domain. For example, for the first depth waveforms or streams, the following relations may hold: and $B_1[0]=B_1[N/2]$, and $B_1[k]=-B_1[N-k]$ for k=1, 2, . . . , N/2-1, where $B_1[k]$ is the symbol for the $k^{th}$ subcarrier, where k=0, 1, . . . , N/2 and N is the number of subcarriers, and $x_1[n]=-x_1[N-n]$ where $x_1[n]$ is the time domain waveform. For the second and greater depth waveforms or streams, the following relations may hold: $A_d[k]=A_d[N-k]$ and $x_d[n]=-x_d[n+N/2^{d-1}]$, where $A_d[k]$ is the symbol at the $k^{th}$ subcarrier, $x_d[n]$ is the time domain waveform, k is the subcarrier number and N is the total number of subcarriers.

As indicated above, the subcarriers may be selected such that the clipping distortion and/or interference due to the at least one or all of the waveforms or streams on at least one or each other waveform or stream does not adversely affect, and/or does not prohibit the reading and/or recovery of, the information carried in the at least one or each other stream or waveform. The selection of the subcarriers used to encode at least one or each information stream or waveform. Array be such that the clipping distortion and/or interference due to at least one or each of the subcarriers of the information stream or waveform does not adversely affect, and/or does not prohibit the reading and/or recovery of, the information carried in other subcarriers of the information stream or waveform and/or carried in subcarriers of at least one or each other information stream or waveform, such as at least one or each other information stream or waveform of a lower depth than the information stream or waveform.

In optional embodiments, the selection of the subcarriers used to encode the at least one other information stream may be such that the interference due to the at least one stream or waveform is orthogonal to the at least one or each other information stream and/or is arranged to cancel in subsequent processing. In this way, the interference due to the at least one information stream on at least one or each other information stream may not adversely affect the information carried in the other information stream(s).

The information streams may be processable to obtain the corresponding original signal. The subcarriers for at least one or each of the streams or waveforms may be selected such that at least part and preferably substantially all of the interference to the stream or waveform caused by at least one or each other stream or waveform is cancelled or removed or removable by the processing operation used to obtain the data from the waveform or stream or by the processing operation used to separate, demodulate or decouple the superimposed streams or waveforms. As indicated above, the subcarriers for at least one or each of the streams or waveforms may be selected such that at least part and preferably substantially all of the clipping distortion falls into unused subcarriers.

The transmission apparatus may be configured to encode parts of the original signal in at least one, two or each of the information stream(s). The transmission apparatus may comprise a splitter for splitting the original signal into a plurality of signal portions, wherein different signal portions are transmitted using different information streams.

At least two or each stream or waveform may be transmitted by a respective different transmitter element (e.g. an LED or other light emitter) and/or transmission channel. At least two or each stream or waveform may be transmitted on a distinct transmitter element or transmission channel.

The original signal may be or comprise a bipolar signal. The plurality of waveforms or streams of the transmission signal may be or comprise unipolar and/or clipped waveforms or streams.

The transmitter may be configured to convert the original signal into the one of more information streams.

The transmission apparatus may be or comprise optical wireless transmission apparatus, such as a visible or infrared light wireless transmission apparatus. However, in embodiments, it will be appreciated that the transmission apparatus may be or comprise transmission apparatus for other communications media such as microwave or radio frequency transmission apparatus, or other regions or the electromagnetic spectrum or sonic transmission apparatus, or the like.

The transmission apparatus may comprise a signal processor. The transmission apparatus may comprise at least one transmitter element for transmitting a processed signal received from the signal processor. The signal processor may be configured to convert the signal from a bipolar signal into a unipolar and/or clipped signal.

The signal processor may comprise at least one signal input for receiving an input signal and/or at least one modulator for modulating the signal and/or a pulse shaper for shaping the signal and/or a clipper for clipping the negative values of the pulse shaped bipolar signal. For example, the signal processor may be configured to apply a pulse shaping filter to the bipolar signal to produce a pulse shaped bipolar signal. The signal processor may be configured to convert one or more portions of the bipolar signal into corresponding unipolar signals, for example, for transmission in the plurality of information streams. The input signal may be split into the portions by the splitter. The signal processor may be configured to clip the negative and/or positive values of the pulse shaped bipolar signal to produce the unipolar signal. The signal processor may be configured to convert one or more portions of the bipolar signal into unipolar signals using PAM-DMT.

The at least one element may comprise an intensity modulated transmitter element. The at least one transmitter element may comprise at least one and preferably a plurality of light emitters, such as an array of LEDs or a micro-LED array, an OLED array, a laser diode array or the like.

The input signal may comprise a bit stream. At least one of the one or more modulators may be configured to apply an amplitude modulation scheme, preferably an M-ary pulse-amplitude modulation (M-PAM) scheme. At least one of the one or more modulators may be configured to modulate according to an orthogonal and/or non-orthogonal multicarrier technique. For example, at least one of the one or more modulators may comprise an OFDM and/or DMT modulator. The modulator may be configured to output the bipolar signal.

The constellation size of at least one or each of the waveforms or streams, e.g. at one or more depths, may have a different constellation size to at least one or each other waveform or stream, e.g. at one or more or each other depth. For example each waveform or stream, e.g. one or more or each depth, may have a different constellation size to each of its neighbours, e.g. the depths immediately higher and/or lower than it. The constellation sizes may comprise 2-PAM, 4-PAM, 8-PAM and/or the like. Each waveform or stream or depth may be assigned an arbitrary constellation size. The arbitrary constellation size may be arbitrarily selected from 2, 4 or more constellation sizes, which may be pre-specified.

The different information streams may be transmitted simultaneously and/or superimposed on the same channel/link or on different channels/links. The different information streams may be combinable, combined or otherwise processed or processable to form at least one signal, and may be transmitted using the same or different transmitter element or elements. Advantageously, at least one or each individual waveform or stream may be transmitted by a different transmitter element, e.g. LED.

According to a second aspect of the present invention is a receiver system for receiving a plurality of transmitted unipolar streams or waveforms from transmission apparatus according to the first aspect, the receiver being configured to receive the data encoded onto at least one or each stream or waveform.

The receiver system may be configured to recover an original signal and/or the transmitted data symbols represented by a plurality of unipolar information streams that are comprised or encoded in one, two or more or each of the waveforms or streams.

The receiver system may comprise a signal processor. The receiver system may comprise one or more receiver elements for receiving the plurality of unipolar streams or waveforms. The signal processor may comprise a filter for filtering, a signal and/or at least one demodulator for demodulating a signal, and an output for outputting an output signal.

The at least one receiver element may comprise a direct detection receiver element. The at least one receiver element may comprise or be comprised in an optical receiver element, such as a photodiode, phototransistor, CCD or CMOS detector, or any other suitable optical detector. The receiver may be a receiver for an optical communications system, such as a visible or infra-red light communications system.

The at least one of the one or more demodulators may be operable with an amplitude demodulation scheme, preferably an M-PAM scheme. At least one of the one or more demodulators may comprise an OFDM and/or DMT demodulator. At least one of the demodulators may be configured to output a bit stream. The filter may comprise a matched filter. The receiver may comprise a sampler.

The received information streams may comprise unipolar information streams. At least one and preferably each of the received information streams may comprise data encoded using a PAM-DMT based method, or other equivalent method, and/or one or more of the information streams may be comprised in respective M-PAM modulated DMT waveforms or streams that may be superimposed.

One or more of the waveforms or streams may be arranged such that clipping distortion, and/or the interference due to the at least one or all of the information streams on at least one or each other information stream or waveform, does not adversely affect, and/or does not prohibit the reading and/or recovery of, the information carried in the at least one or each other information stream or waveform. The selection of the subcarriers used to encode at least one or each information stream or waveform may be such that the clipping distortion, and/or the interference due to at least one or each of the subcarriers of the information stream or waveform, does not adversely affect, and/or does not prohibit the reading and/or recovery of, the information carried in other subcarriers of the information stream or waveform and/or in subcarriers of at least one or each other information stream waveform, such as at least one or each other information stream or waveform of a lower depth than the information stream or waveform. The subcarriers for at least one or each of the streams or waveforms may be selected such that at least part and preferably substantially all of the clipping distortion falls onto unused subcarriers.

The receiver may be configured to estimate the clipping distortion and/or the distortion of one or more of the streams or waveforms due to one or more or each other stream or waveform, such as at least one or each stream or waveform of lower depth than the information stream or waveform.

The receiver may be configured to determine, separate out, decouple, extract and/or demodulate the stream or waveform at the first depth by processing or demodulating only the imaginary components of the subcarriers. The receiver may be configured to re-modulate the stream or waveform from the demodulated stream or waveform. The receiver may be configured to subtract or remove the re-modulated stream or waveform from the superimposed information streams or waveforms, e.g. to obtain the remaining superimposed waveforms or streams without the original first depth or depth 1 waveform or stream.

For each stream or waveform of the second depth (e.g. depth 2) and higher, the receiver may be configured to iteratively determine, separate out, decouple, extract and/or demodulate the lowest depth stream or waveform remaining in the superimposed streams or waveforms by processing or demodulating only the subcarriers associated with the lowest depth stream or waveform, e.g. as indicated by the associated algorithm, index or grammar. The receiver may be configured to re-modulate the demodulated stream or waveform. The receiver may be configured to subtract or remove the re-modulated lowest depth stream or waveform from the superimposed streams or waveforms. The receiver may be configured to iteratively repeat the above process, e.g. determine, separate out, extract, decouple and/or demodulate the lowest depth stream or waveform and remove it from the superimposed streams or waveforms in turn until all of the information streams or waveforms have been demodulated or extracted.

According to a third aspect of the present invention is a communications system comprising a transmission apparatus according to the first aspect and a receiving system according to the second aspect.

According to a fourth aspect of the present invention is a transmission method. The method may comprise generating a transmission signal, such as a unipolar signal, representative of an original signal comprising data portions, the data being carried by or comprised in waveforms or streams, the respective waveforms or streams being generated by allocating and/or loading the data onto selected data symbols and/or subcarriers in the frequency domain to form the transmission signal; and transmitting the waveforms or streams.

One or more of the information streams may be arranged such that the data portions are obtainable, recoverable and/or extractable from the waveforms or streams. The method may comprise transmitting at least two, e.g. three or more information streams and/or associated waveforms or streams.

The method may comprise forming each waveform or stream by providing data symbols on, or allocating data symbols to, selected subcarriers. The data symbols may be representative of the data of the original signal. The data symbols may be or comprise modulation symbols, such as pulse-amplitude modulation (M-PAM) symbols. Each waveform or stream may comprise different selected subcarriers. The method may comprise selecting the subcarriers that define the different waveforms or streams, e.g. according to an algorithm, index or grammar. The different super-imposed waveforms or streams may be identified as a plurality of different depth waveforms or streams, which may comprise a first depth waveform or stream, a second depth waveform or stream, and so on until a required number of waveforms or streams to carry all of the data portions of the original signal has been provided. At least two or each of the waveforms or streams may have a different data capacity. The depth of the waveform or stream may be inversely related to the data capacity.

The method may comprise selecting, loading or allocating the subcarriers used to form or comprised in each waveform or stream such that there is no clipping distortion and/or inter-waveform or inter-stream interference with at least one or more or each other waveform or stream. The method may comprise selecting, loading or allocating the subcarriers forming or comprised in each waveform or stream such that clipping distortion and/or interference due to at least one of the waveforms or streams (e.g. of the superimposed waveforms or streams) on at least one or each other of the waveforms or streams (e.g. of the superimposed waveforms or streams) does not adversely affect, and/or does not prohibit the reading and/or recovery of, the information carried by the at least one or each other of the waveforms or streams. The subcarriers for at least one or each of the streams or waveforms may be selected such that at least part and preferably substantially all of the clipping distortion falls into unused subcarriers.

The method may comprise loading symbols only onto imaginary components of the sub-carriers in order to form at least one of the waveforms or streams, e.g. a first depth waveform or stream. The method may comprise leaving real components of the subcarriers unused for the first depth waveform or stream. The first depth waveform or stream may comprise a conventional PAM-DMT waveform or stream.

The method may comprise loading symbols only onto real components of the sub-carriers in order to form one or more of the waveforms or streams, such as waveforms or streams of a second and greater depth or a depth greater than the first depth. The method may comprise leaving subcarriers other than those provided with symbols unused, empty or zero valued.

The method may comprise forming each of the waveforms or streams of the second and greater depth or depth greater than the first depth, e.g. the waveforms or streams that are formed or comprised of subcarriers having real symbols, of different subcarriers or combinations of subcarriers. At least one or each of the waveforms or streams, such as the waveforms or streams of the second and greater depth or depth greater than the first depth, may be formed or comprise symbols being provided on allocated or selected subcarriers that are selected or allocated according to an index or grammar. At least one or each of the second depth or greater waveforms or streams may be M-PAM modulated DMT waveforms or streams that may be superimposed.

The method may comprise transmitting different information streams and/or the associated waveforms or streams simultaneously and/or superimposed on the same channel/link or on different channels/links. The method may comprise transmitting the waveforms or streams using the same or different transmitter element or elements. Advantageously, at least one or each waveform or stream may be transmitted by a different transmitter element, e.g. LED.

Optionally but not essentially, the method may be or comprise a non-MIMO transmission method. The method may be carried out using only a single transmitter element and/or transmission channel or link for transmitting a processed signal. For example, the method may comprise transmitting the information streams (e.g. the one or more information streams and the at least one other information stream) on each or part of an individual stream, channel, link or signal, which may optionally be an individual stream, channel, link or signal of a MIMO system. The different information streams may be transmitted simultaneously on the same channel/link. The different information streams may be combinable, combined or otherwise processed or processable to form at least one frequency domain signal.

The constellation size of at least one or each of the waveforms or streams, e.g. at one or more depths, may have a different constellation size to at least one or each other waveform or stream, e.g. at one or more or each other depth. For example each waveform or stream, e.g. one or more or each depth, may have a different constellation size to each of its neighbours, e.g. the depths immediately higher and/or lower than it. The constellation sizes may comprise 2-PAM, 4-PAM, 8-PAM and/or the like. Each waveform or stream or depth may be assigned an arbitrary constellation size. The arbitrary constellation size may be arbitrarily selected from 2, 4 or more constellation sizes, which may be pre-specified.

The transmission method may comprise use of the transmission apparatus of the first aspect and/or may comprise at least one feature described in relation to the first aspect.

According to a fifth aspect of the present invention is a method for receiving and/or decoding and/or recovering data from a plurality of superimposed waveforms or streams.

The waveforms or streams may be waveforms or streams transmitted by the transmission apparatus of the first aspect and/or using the method of the third aspect. The method may comprise using a receiver according to the second aspect.

The received information streams may comprise unipolar information streams. At least one of the received information streams may comprise data encoded using a PAM-DMT based method, or any other suitable equivalent method. At least one or each of the waveforms, or streams, e.g. second depth or greater waveforms or streams, may be M-PAM modulated DMT waveforms or streams that may be superimposed.

One or more of the waveforms may be arranged such that the clipping distortion and/or interference due to the at least one or all of the information streams on at least one or each other information stream or waveform does not adversely affect, and/or does not prohibit the reading and/or recovery of, the information carried in the at least one or each other information stream or waveform. The selection of the subcarriers used to encode at least one or each information stream or waveform may be such that the clipping distortion and/or the interference due to at least one or each of the subcarriers of the information stream or waveform does not adversely affect, and/or does not prohibit the reading and/or recovery of, the information carried in other subcarriers of the information stream or waveform and/or in subcarriers of at least one or each other information stream or waveform, such as at least one or each other information stream or waveform of a lower depth than the information stream or waveform. The subcarriers for at least one or each of the streams or waveforms may be selected such that at least part and preferably substantially all of the clipping distortion falls into unused subcarriers.

The method may comprise estimating the distortion of one or more of the information streams or waveforms due to one or more or each information stream of lower depth than the information stream or waveform.

The method may comprise determining or demodulating the stream or waveform at the first depth, e.g. by processing or demodulating only the imaginary components of the subcarriers. The method may comprise re-modulating the stream or waveform from the first depth. The method may comprise subtracting or removing the re-modulated stream from the first depth from the superimposed streams or waveforms, e.g. to obtain a remainder of the superimposed information streams or waveforms without the previous first depth stream or waveform.

The method may comprise, for each stream or waveform of the second depth and higher, iteratively demodulating or extracting the lowest depth stream or waveform remaining in the superimposed streams or waveforms, e.g. by processing or demodulating only the subcarriers associated with the lowest depth stream or waveform, e.g. as indicated by the associated algorithm, index or grammar. The method may comprise re-modulating the stream or waveform from the lowest depth information stream. The method may comprise subtracting or removing the re-modulated lowest depth stream or waveform from the superimposed streams or waveforms. The method may comprise iteratively demodulating and/or extracting lowest depth stream or waveform in turn until all of the streams or waveforms have been demodulated or extracted.

According to a sixth aspect of the present invention is a device comprising a communications system, wherein the communications system comprises transmission apparatus according to the first aspect and/or a receiver system according to the second aspect.

The device may comprise a fixed transmitter and/or receiver unit or system. The device may be or comprise a mobile communications device, such as a tablet computer, mobile phone, smart watch, a sensor, and/or the like. The communications system may comprise an optical wireless communications system. The communications system may comprise a two-way communications system. The communications system may comprise a one way communications system.

According to a seventh aspect of the present invention is a computer program product configured to implement the apparatus of the first, second, third or sixth aspects or the method of the fourth or fifth aspects.

According to an eighth aspect of the present invention is a carrier medium comprising or carrying the computer program product of the seventh aspect.

According to a ninth aspect of the present invention is a processing or computational apparatus when loaded with the computer program product of the seventh aspect.

Features described in relation to any of the above aspects may also be applicable to any of the other above aspects. Features described in combination in relation to any of the above aspects may be jointly or individually and separably applicable to any other of the above aspects. Apparatus features configured to implement the features described above in relation to a method and also method features corresponding to the use and fabrication of any apparatus features described above are also intended as falling within the scope of the present invention.

BRIEF DESCRIPTION OF THE DRAWINGS

These and other aspects of the present invention will now be described, by way of example only, with reference to the accompanying drawings, in which.

DETAILED DESCRIPTION OF THE DRAWINGS

Figure 1:
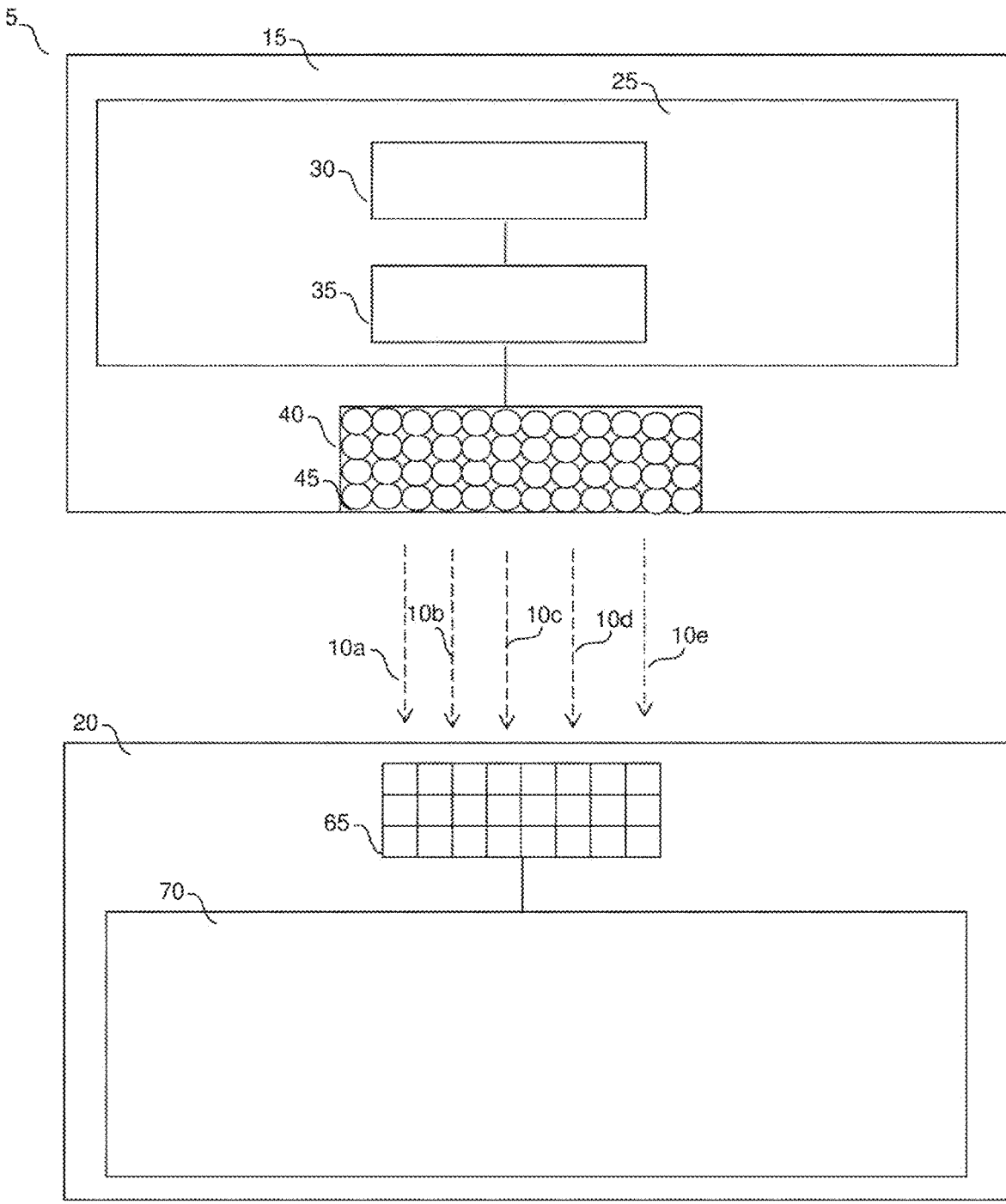
FIG. 1 is a schematic of a communications system for implementing the present invention.

As detailed above, traditional OFDM generally produces complex valued time domain samples, whereas the intensity modulation/direct detection techniques commonly used in optical wireless communications require real unipolar signals. The DCO-OFDM technique can be used to produce a non-negative, unipolar signal but this technique significantly increases the power dissipation of the signal. U-OFDM, ACO-OFDM, PAM-DMT and Flip-OFDM methods can also be used to provide unipolar signals and are capable of much greater power efficiency than the DCO-OFDM scheme. However, the spectral efficiency of these methods is halved when compared with DCO-OFDM.

WO2015/036786, in the name of the present applicant and the contents of which are incorporated by reference as if they were set out in full herein, introduced the concept of superposition modulation in the time domain to increase the spectral efficiency. In particular, multiple information streams are concurrently arranged in the time domain so as to be superimposed and transmitted in a manner that minimises or eliminates inter-stream interference.

However, implementation issues put a practical limit on the maximum number of depths that can be used, including: latency, computational complexity and memory requirements. Moreover, each additional stream added on top of an existing time domain signal formed by the streams at lower depths. Therefore, the energy per bit for each additional stream increases as the modulation depth increases. Considering that the spectral efficiency of each additional stream decreases exponentially, it can be assumed a practical implementation of the methods taught in WO2015/036786 is likely to be realized using only a few information streams.

Superimposing multiple streams of PAM-DMT encoded data in the time domain requires the multiple time domain PAM-DMT streams to be aligned. However, aligning the antisymmetry in superimposed time-domain PAM-DMT streams is complex and results in efficiency losses.

At least some embodiments of the present invention seek to provide a technique for forming unipolar signals for transmission using a simple method to apply superposition modulation based on M-PAM modulated discrete multitone (DMT) techniques. Contrary to eU-OFDM, which is discussed in WO2015/036786 in the name of the present applicant, and other techniques that superimpose multiple streams in the time domain, the present invention comprises, in the frequency domain, loading data symbols onto selected subcarriers to form two or more depths of waveform or stream, wherein the selection of subcarriers is such that any subsequent zero level clipping of negative samples of the bipolar waveform does not affect the information loaded on the subcarriers, i.e. no clipping distortion falls into the loaded subcarriers. This involves aligning the symmetry and or the anti-symmetry of the waveforms or streams in the frequency domain. The waveforms or streams can then be clipped and superimposed for transmission.

The present inventors have unexpectedly discovered that this results in an improved spectral and energy efficiency over the above techniques, such as eU-OFDM. Furthermore, the system performance is shown to offer significant electrical and optical energy savings compared with aligning or forming the streams in the time domain (i.e. ePAM-DMT) and DC-biased optical orthogonal frequency division multiplexing (DCO-OFDM).

As such, at least some embodiments of the present invention seek to provide a technique for forming unipolar signals for transmission in a manner that is both power efficient and spectrally efficient.

In techniques that utilise superimposed information streams, the information from one information stream can act as distortion towards the information on the other information streams. As such, when the information from the first stream is decoded, the information from all subsequent streams can act as a strong noise component, which could inhibit or prevent recovery of the first information stream.

At least some embodiments of the present invention address this problem by, in the frequency domain, assigning selected subcarriers to each information stream or waveform (i.e. to each "depth" of superimposed stream or waveform) according to an algorithm, index or grammar in arrangements that result in clipping distortion, and/or the interference due to the at least one or all of the information streams on at least one or each other information stream or waveform, not adversely affecting, and/or not prohibiting the reading and/or recovery of, the information, e.g. carried in the at least one or each other information stream or waveform.

In particular, the data for a given stream or waveform (i.e. a given depth of superimposed streams or waveforms) may be assigned to subcarriers selected such that the clipping distortion due to the clipping of the waveforms or streams falls on or into unused subcarriers and/or such that the selected subcarriers do not interfere with the other selected subcarriers in the same information stream or waveform (i.e. at the same "depth") or with at least one other information stream or waveform (e.g. at a lower "depth" information stream or waveform). This allows the data carried in the lowest depth information stream or waveform to be extractable from the transmitted signal. The extracted data symbols can then be used to re-modulate the extracted data to obtain the lowest depth information stream or waveform, which can then be subtracted from the received superimposed streams/waveforms in order to leave the remaining superimposed information streams/waveforms. The process can then be iteratively repeated with the next lowest depth waveform/information stream until all the data from all of the information streams has been extracted.

One particularly beneficial arrangement for allocating or selecting the subcarriers to carry data for each depth is as follows. For the first or lowest depth of waveform or information stream, symbols representing the data are selectively loaded or allocated only onto the imaginary components of the subcarriers (i.e. not onto the real components).

Each of the other waveforms or information streams (i.e. those of the second and higher depth waveforms or streams) are defined by an allocation or selection of real subcarriers that are loaded or loadable with symbols of the data according to a specific algorithm, index or grammar that defines which subcarriers are associated with each depth of waveform or information stream. It will be appreciated that each depth of waveform or stream from the second depth upwards is associated with a unique or mutually exclusive subset of the subcarriers. For example, in a specific exemplary embodiment, the subcarriers that are loaded with data symbols may be specified by:

$$X_d[k'] = \begin{cases} A_d[k'], & \text{if } k' = 2^{d-2}(2k+1) \\ 0, & \text{Otherwise} \end{cases}$$

where $X_d[k']$ is the frequency domain waveform, $A_d[k']$ is the M-PAM symbol at the $k^{th}$ subcarrier of depth d, and −0, 1, ..., $N/2^d−1$. Hermitian symmetry is also used to ensure that the frequency domain transformation of the waveform is real, i.e. $A_d[k]=A_d[N−k]$.

In this way, the data can be encoded by superimposing information streams/waveforms as M-PAM modulated DMT waveforms or streams at multiple depths in the frequency domain, by selective assigning of data symbols only to selected subcarriers according to an index or grammar. This can be used to increase the spectral efficiency relative to the PAM-DMT technique, yet still avoid inter-stream interference and allow the originally encoded data to be easily recoverable. In particular, the frequency distributed waveform technique disclosed herein avoids the spectral efficiency losses of time distributed PAM-DMT and provides improvements in energy efficiency over both time distributed PAM-DMT and DCO-OFDM.

In particular, the present inventors have discovered that the technique described herein may advantageously result several benefits, including:
1. Inherent support of superposition modulation theory;
2. Significant spectral efficiency gains;
3. Simpler transmitter and receiver design;
4. Lower delay;
5. Smaller buffer sizes requirements
6. Less computational complexity, since FFT/IFFT is performed on sparse 1-Dimensional modulated symbols (M-PAM);
7. Achieves the exact spectral efficiency of DCO-OFDM with no DC bias (using optimized constellation sizes);
8. Improved iterative receiver design can improve the power efficiency; and
9. The modulation scheme can be implemented using multiple LEDs in an array which have the advantage of reducing the PAPR.

FIG. 1 shows a communications system 5 configured to implement various embodiments of the present invention. The communications system 5 is configured to generate unipolar information streams or waveforms 10 for transmission from a transmission side to a receiver side, and to reconstruct data from the received unipolar information streams or waveforms 10 at the receiver side. The present invention is particular suitable for optical wireless communications systems and is described herein in relation to this application. However, it will be appreciated that the present invention may also be applicable to other communications systems such as those using microwave or radio frequency radiation, or other regions or the electromagnetic spectrum or sonic communications methods, or the like.

Furthermore, the plurality of information streams or waveforms 10 will be described in terms of depth of the information stream or waveform 10 wherein the depth is inversely proportional to the capacity of the information stream or waveform 10. In other words, the highest capacity information stream or waveform 10a is referred to as the stream or waveform having depth 1 and each further information stream or waveform 10b, 10c, 10d, 10e having successively lower capacity is referred to as streams or waveforms of depth 2, 3, 4, 5, and so on.

The communications system 5 comprises one or more transmitters 15 for converting the bipolar signal into the plurality of unipolar information streams 10 and for transmitting the plurality of unipolar information streams 10 to one or more receivers 20 for receiving the unipolar information streams 10 and reconstructing the bipolar signal from the received unipolar information streams 10.

The transmitter 15 is provided with a signal processor configured to implement a splitter 30 for splitting the original data into a plurality of portions, each portion for transmission using respective waveforms or streams of different depths. The transmitter 15 further comprises a transmission apparatus 40 for transmitting the information streams 10. It will be appreciated that the different information streams 10 can be transmitted simultaneously or sequentially, e.g. at fully overlapping times or at partially or wholly non-overlapping times. As such, it will be appreciated that the transmission of the different streams or waveforms 10 may be concurrent or non-concurrent.

The splitter 30 is configured to split the data into appropriately sized portions for transmission in the plurality of waveforms or streams 10. As will be apparent from the following, each waveform or stream 10 is capable of different transmission rates and/or capacities. As such, the data is not split equally, and more of the data is assigned to higher capacity (i.e. lower depth) streams 10 than to lower capacity (i.e. higher depth) streams 10. The relative transmission capacities of each stream 10 are straightforwardly determinable, as will be evident from the description below.

The transmission apparatus 40 comprises an array of transmitter elements 45, such as LEDs, OLEDs, laser diodes or the like. In an optional embodiment, the transmission apparatus comprises a micro LED or OED array.

The converter module 35 is configured to convert each waveform or stream representing each portion of the data into a unipolar signal for transmission in the associated information stream 10 by clipping the negative values to zero rated values. In other words, the converter module 35 is simply a clipping module. The original data is comprised in an OFDM and/or DMT signal realised by taking the inverse fast Fourier transform of data encoded by symbols from a conventional modulation scheme known in the art, such as pulse amplitude modulation (M-PAM). In this particular embodiment, the converter module 35 is configured to convert the signal to a unipolar signal using a selective loading algorithm in which multiple M-PAM modulated DMT streams or waveforms are aligned in the frequency domain and superimposed in the time domain are transmitted.

Figure 2:
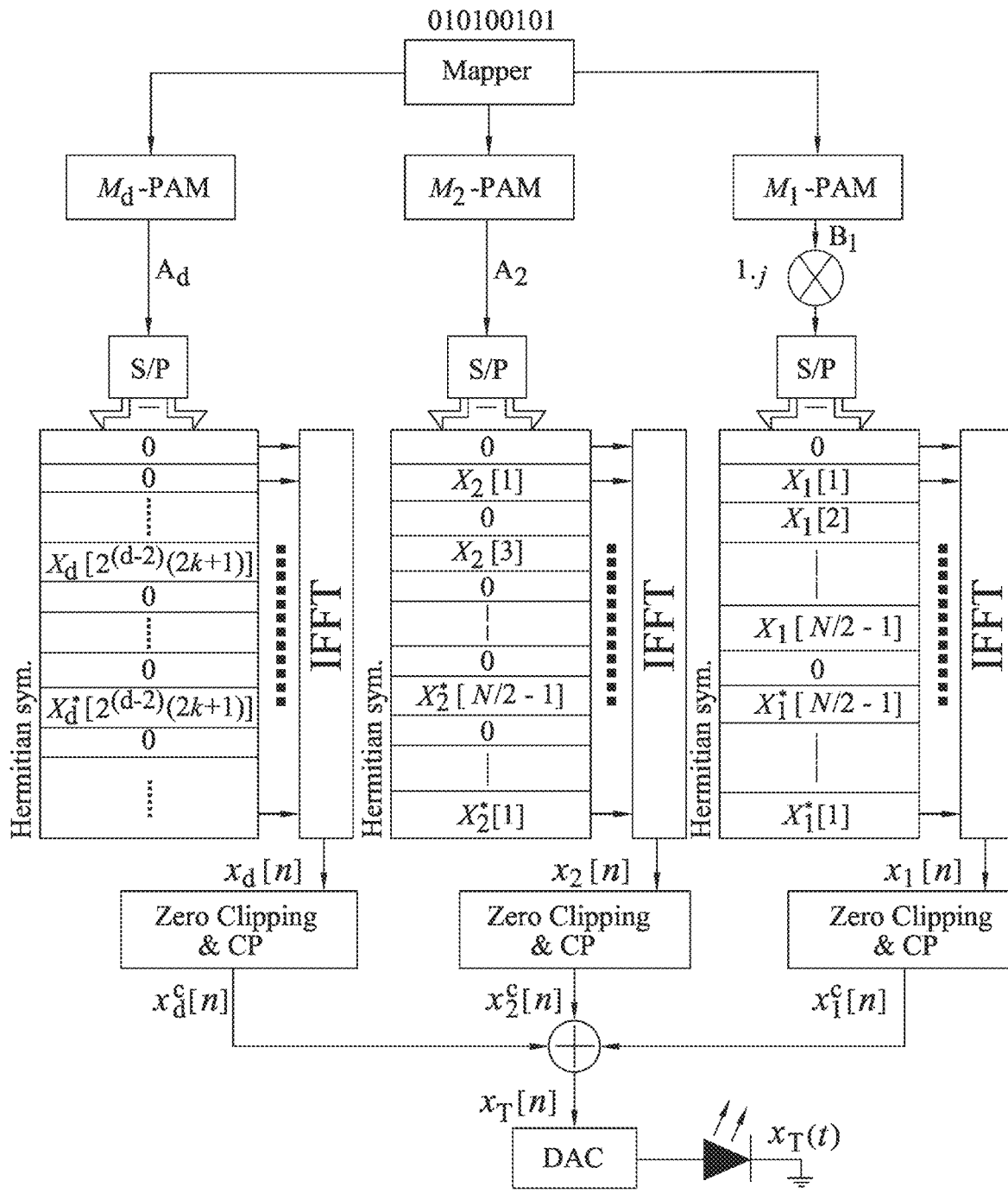
FIG. 2 is a schematic diagram of a transmitter for the optical communications system of FIG. 1.
Figure 3:
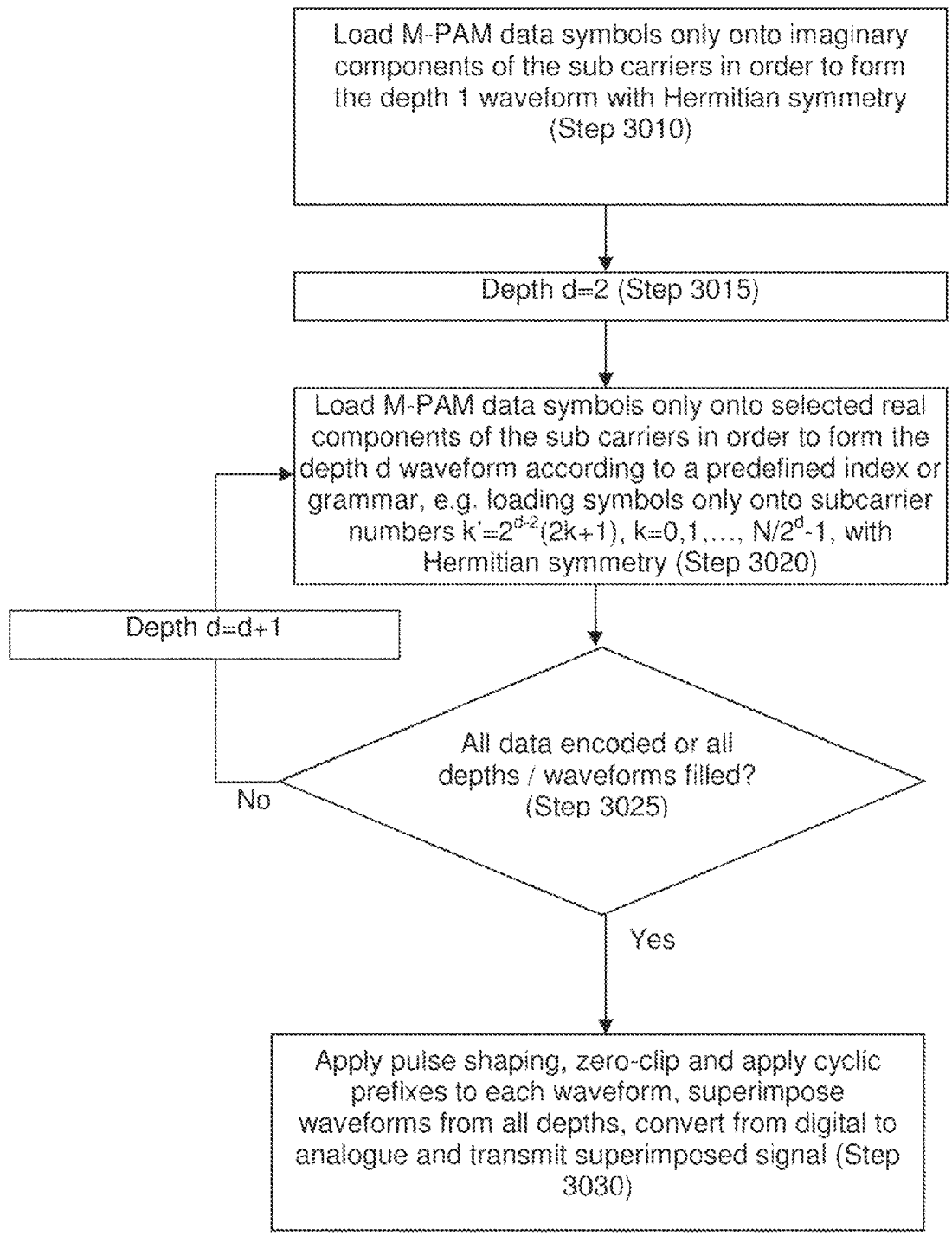
FIG. 3 is a flowchart of a method of preparing and transmitting a signal for transmission using the system of FIG. 1 having the transmitter of FIG. 2.

A functional schematic of the transmitter 15 of FIG. 1 is shown in FIG. 2. The method by which the transmitter 15 operates is shown in FIG. 3.

The portions of the original signal as split by the splitter 30 are encoded on streams or waveforms by selectively loading the data only onto selected subcarriers in the frequency domain, before zero level clipping of negative samples of the bipolar waveform to form corresponding unipolar signals and superimposing the signals in the time domain for transmission.

Figure 6:
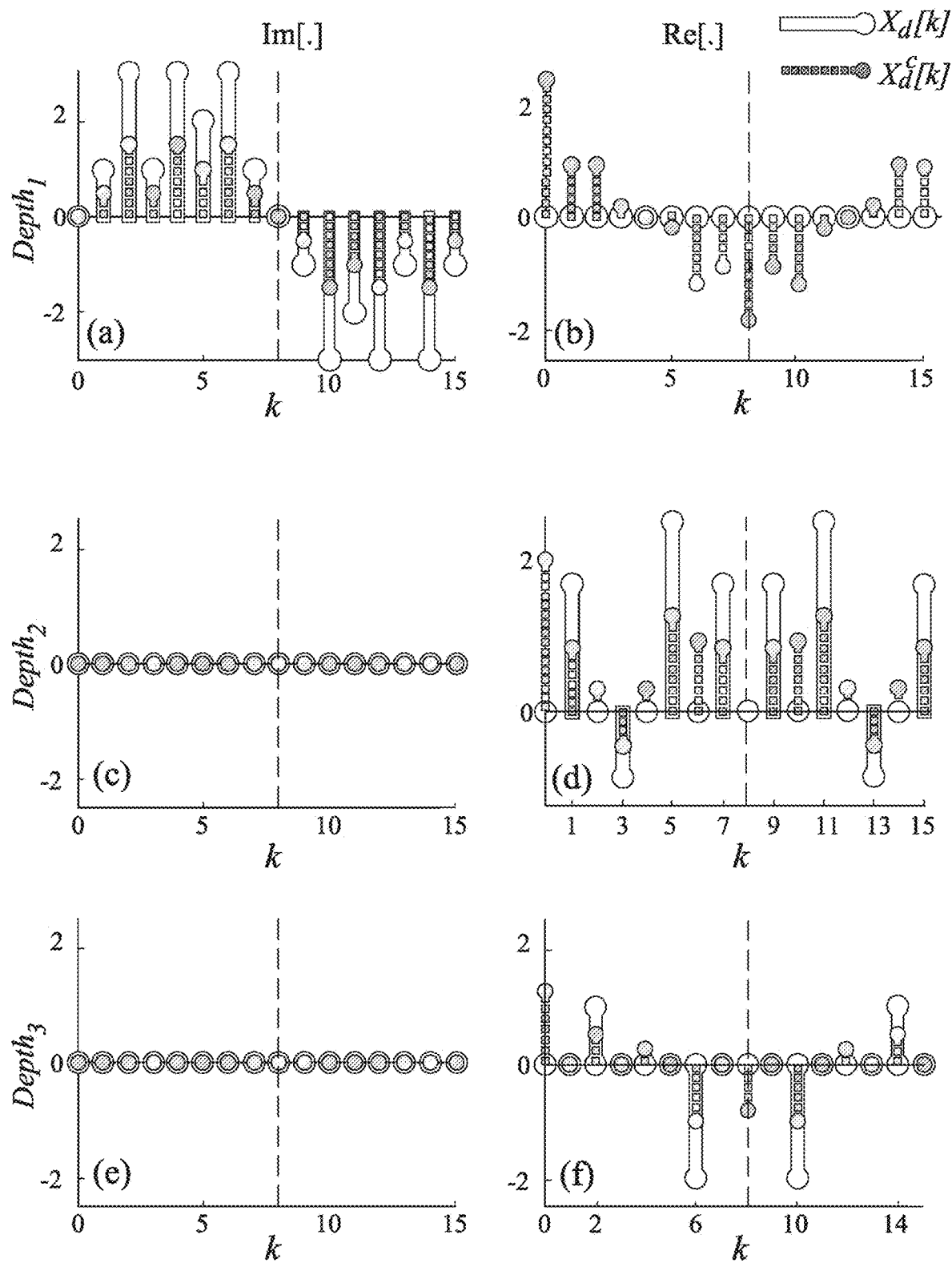
FIG. 6 illustrates the frequency domain subcarrier loading at three depths and the effects of zero clipping with the transmission scheme illustrated by the method of FIG. 3, wherein (a) and (c) and (e) show the imaginary components of the subcarriers before and after zero level time-domain clipping, (b) and (d) and (1) shows the real components of the subcarriers before and after zero level time-domain clipping.

In a convention PAM-DMT technique, a frame of data from the signal is divided into two parts A, B, as shown in FIG. 6. If Nfft is the PAM-DMT frame size, then the first part A ranges from the first sample of the frame (at position 0) until sample $$\frac{Nfft}{2} - 1,$$

and the second part B of the frame ranges from sample $$\frac{Nfft}{2}$$

until sample Nfft−1 which is the last sample of the frame. It should be noted that this example is illustrated for a frame whose size is an even number since the most efficient application of the FFT/IFFT algorithms is realised for a number of samples that are a power of two. In case the frame has an odd number of samples, the principle is analogous with a minor correction in the time-domain sample indexing. The cyclic prefix size is not counted in this calculation.

The PAM-DMT frame is oddly symmetrical or anti-symmetrical as described in "PAM-DMT for Intensity Modulated and Direct-Detection Optical Communication Systems", *IEE Photonics Technology Letters*, Vol. 21, no. 23, pp. 1749-1751, December 2009. In conventional PAM-DMT, the subcarriers in the frequency domain are modulated with imaginary PAM symbols. This causes the bipolar (before clipping) PAM-DMT frame to possess a type of anti-symmetry termed odd symmetry. This means that if s[n] represents the samples of the time domain signal within one bipolar PAM-DMT frame and there are Nfft samples with n taking values between 0 and Nfft/2−1, then s[0]=s[Nfft/2]=0 and s[n]=−s[Nfft−n] for the rest of the frame. This means that the first half of the frame is oddly-symmetric to the second part of the frame. This can also be expressed as A[0]=B[0] and A[n]=−B[Nfft/2−n] where A indicates the first half of the frame with length Nfft/2 and indexed from n=0 to n=Nfft/2−1 and B indicates the second half of the frame with length Nfft/2 and indexed from n=0 to n=Nfft/2−1. In this case it can be said that A and B are oddly-symmetric. This anti-symmetry (called odd symmetry) allows the negative samples to be removed without distortion. Even symmetry is defined as follows. If P is a frame or a part of a frame or a block of any number of samples with a length of Nfft/2 and indexed from n=0 to n=Nfft/2−1 then $\overline{P}$ is evenly-symmetric to P so P(0)=$\overline{P}$(0) and P(n)=$\overline{P}$(Nfft/2−n).

Rather than transmitting the signal as a single PAM-DMT waveform, as in conventional PAM-DMT, the transmitter 15 is configured to produce several M-PAM modulated DMT waveforms or streams that are subsequently superimposed.

In order to encode the first depth of the transmission signal (step 3010 in FIG. 3), the imaginary components of the subcarriers are loaded with M-ary pulse-amplitude modulation (M-PAM) symbols while the real components are kept unused, i.e. $X_1[k]=jB_1[k]$, where $X_1[k]$ is the frequency domain transformation of the information stream, and $B_1[k]$ is the M-PAM symbol at the $k^{th}$ subcarrier of depth 1. Hermitian symmetry is provided in the frequency domain to guarantee a real time-domain output, i.e. B1[0]=B1[N/2], and $B_1[k]=−B_1[N−k]$ for k=1, 2, ..., N/2−1. As a result, the time domain PAM-DMT waveform $x_1[n]$ can be written as:

$$x_1[n] = \frac{1}{\sqrt{N}} \sum_{k=0}^{N-1} X_1[k] e^{\frac{j2\pi kn}{N}} \quad \text{(Equation 1)}$$

$$= \frac{-2}{\sqrt{N}} \sum_{k=1}^{N/2-1} B[k] \sin\frac{2\pi kn}{N}$$

The time domain PAM-DMT waveform in Equation 1 exhibits the following antisymmetry: $x_1[n]=-x_1[N-n]$, where $x_1[0]=x_1[N/2]=0$. Applying conventional PAM-DMT clipping (see e.g. D. Tsonev, S. Sinanovic, and H. Haas, "Complete modelling of nonlinear distortion in OFDM-based optical wireless communication," J. Lightw. Technol. 31, 3064-3076 (2013), the contents of which are incorporated by reference as if set out in full), the clipping at zero level is described as:

$$x_d^c[n] = \frac{x_d[n] + |x_d[n]|}{2} \quad \text{(Equation 2)}$$

and the frequency domain transformation of the clipped waveform $x_d^c[n]$, can be shown as:

$$X_d^c[k] = \frac{X_d[k] + FFT\{|x_d[n]|\}}{2} \quad \text{(Equation 3)}$$

where the subscripts d denotes the depth d index, and $X_d[k]=FFT\{x_d[n]\}$. The effects of clipping on the subcarriers are shown in FIG. 6. Clipping of the negative samples at depth 1 is distortion-less to the information at the same depth because all of the distortion transforms into the real part of the subcarriers. As a simple proof, the distortion term $|x_1[n]|$ has a Hermitian symmetry $|x_1[n]|=|x_1[N-n]|$, which can also be proved by:

$$FFT\{|x_1[n]|\} = \frac{1}{\sqrt{N}} \sum_{n=0}^{N-1} |x_1[n]| e^{-\frac{j2\pi kn}{N}} \quad \text{(Equation 4)}$$

$$= \frac{2}{\sqrt{N}} \sum_{n=1}^{N/2-1} |x_1[n]| \cos\frac{2\pi kn}{N}$$

At depth 2 (step 3015 in FIG. 3), the odd subcarriers are loaded with real valued M-PAM symbols $X_2[k]=A_2[k]$, while the other real value subcarriers are kept unused (step 3020). The subcarriers at depth 2, $X_2[k]$, can be written as:

$$X_2[k'] = \begin{cases} A_2[k'], & \text{if } k' = 2k+1 \\ 0, & \text{Otherwise} \end{cases} \quad \text{(Equation 5)}$$

$A_2[k']$ is the M-PAM symbol at the $k^{th}$ subcarrier of depth 2; and $k=0, 1, \ldots, N/4-1$. Hermitian symmetry is also provided to guarantee that $x_2[k]$ is real, i.e. $A_2[k]=A_2[N-k]$. As a result, the time domain waveform at depth 2, $x_2[n]$, has the following symmetry: $x_2[n]x=-x_2[n+N/2]$.

Therefore, the distortion caused by clipping at zero level only affects the real domain even subcarriers. This can be shown as:

$$FFT\{|x_2[n]|\} = \frac{1}{\sqrt{N}} \sum_{n=0}^{N/2-1} |x_2[k]| e^{-\frac{j2\pi kn}{N}} (1 + e^{-j\pi k}) \quad \text{(Equation 6)}$$

which takes values only at $x_2^c[2k]$, for $k=0, 1, \ldots, N/2-1$. Therefore, the distortion is orthogonal to the information content at depth 1 and depth 2.

Subsequent streams can be generated at depth d, where the subcarriers will be loaded with real valued M-PAM symbols (steps 3020 and 3025):

$$X_d[k'] = \begin{cases} A_d[k'], & \text{if } k' = 2^{d-2}(2k+1) \\ 0, & \text{Otherwise} \end{cases} \quad \text{(Equation 7)}$$

where $A_d[k']$ is the M-PAM symbol at the $k^{th}$ subcarrier of depth d; and $k=0, 1, \ldots, N/2d-1$. Hermitian symmetry is also required to guarantee that $x_d[n]$ is real, $A_2[k]=A_d[N-k]$. Using Equation 7, it can be shown that:

$$x_d[n]=-x_d[n+N/2^{d-1}] \forall d>1. \quad \text{(Equation 8)}$$

Using Equation 3. $X_d[k]$ can be re-written as:

$$X_d[k] = \frac{1}{\sqrt{N}} \sum_{n=0}^{N/2^{d-1}-1} x_d[k] e^{-\frac{j2\pi kn}{N}} \kappa \left(1 - e^{\frac{-j\pi k}{2^{D-2}}}\right) \quad \text{(Equation 9)}$$

and the zero level clipping distortion effect on the subcarriers in the frequency domain can be written as:

$$FFT\{|x_d[n]|\} = \frac{1}{\sqrt{N}} \sum_{n=0}^{N/2^{d-1}-1} |x_d[k]| e^{-\frac{j2\pi kn}{N}} \kappa \left(1 + e^{\frac{-j\pi k}{2^{D-2}}}\right) \quad \text{(Equation 10)}$$

where D is the total number of used depths, and can be written as:

$$\kappa = \prod_{d=2}^{D-1} \left(1 + e^{\frac{-j\pi k}{2^{d-2}}}\right) \quad \text{(Equation 11)}$$

Using equations 9 and 10, it can be shown that the zero level clipping is distortion-less to the information content at $X_d^c[2^{d-2}(2k+1)]$, and that all of the distortion will affect the subcarriers at $X_d^c[2^{d-1}k]$. Using this technique of selective subcarrier indexes loading at each depth will allow multiple M-PAM modulated waveforms to be superimposed without any inter-stream interference. The active subcarriers of each superimposed depth will not be affected by the zero level clipping distortion of the current and subsequent depths. However, they will be affected by the distortion of the zero level clipping of the previous depths. This distortion will be estimated and cancelled at the receiver, as described in relation to FIG. 4 below.

After generating the time domain waveforms of each depth, the respective generated waveforms are clipped and the cyclic prefixes are added (step 3030). The overall waveform can be obtained by superimposing the clipped waveforms of all depths:

$$x_T[n] = \sum_{d=1}^{D} x_d^c[n] \qquad \text{(Equation 12)}$$

Using equations (2) and (3), the subcarriers can be written as:

$$X_T[k] = \frac{jB_1[k] + \sum_{d=2}^{D} A_d[k] + \sum_{d=1}^{D} FFT\{|X_d[n]|\}}{2} \qquad \text{(Equation 13)}$$

The superimposed waveform is then converted from digital to analogue and transmitted using the transmission apparatus 40 of FIG. 1. Although it is possible to transmit each of the respective waveforms using the same transmission element 45 of the transmission apparatus, each of the waveforms that together make up the superimposed waveforms can advantageously be transmitted by different transmission elements 45.

The receiver 20 (see FIG. 1) comprises one or more receiver elements 65, such as a single photodiode, or an array of photodiodes, CCD or CMOS receiver elements, for receiving the plurality of unipolar information streams 10a-10e. The receiver 20 further comprises a signal processor 70 for processing the plurality of unipolar information streams 10a-10e in order to recover the original data.

Figure 4:
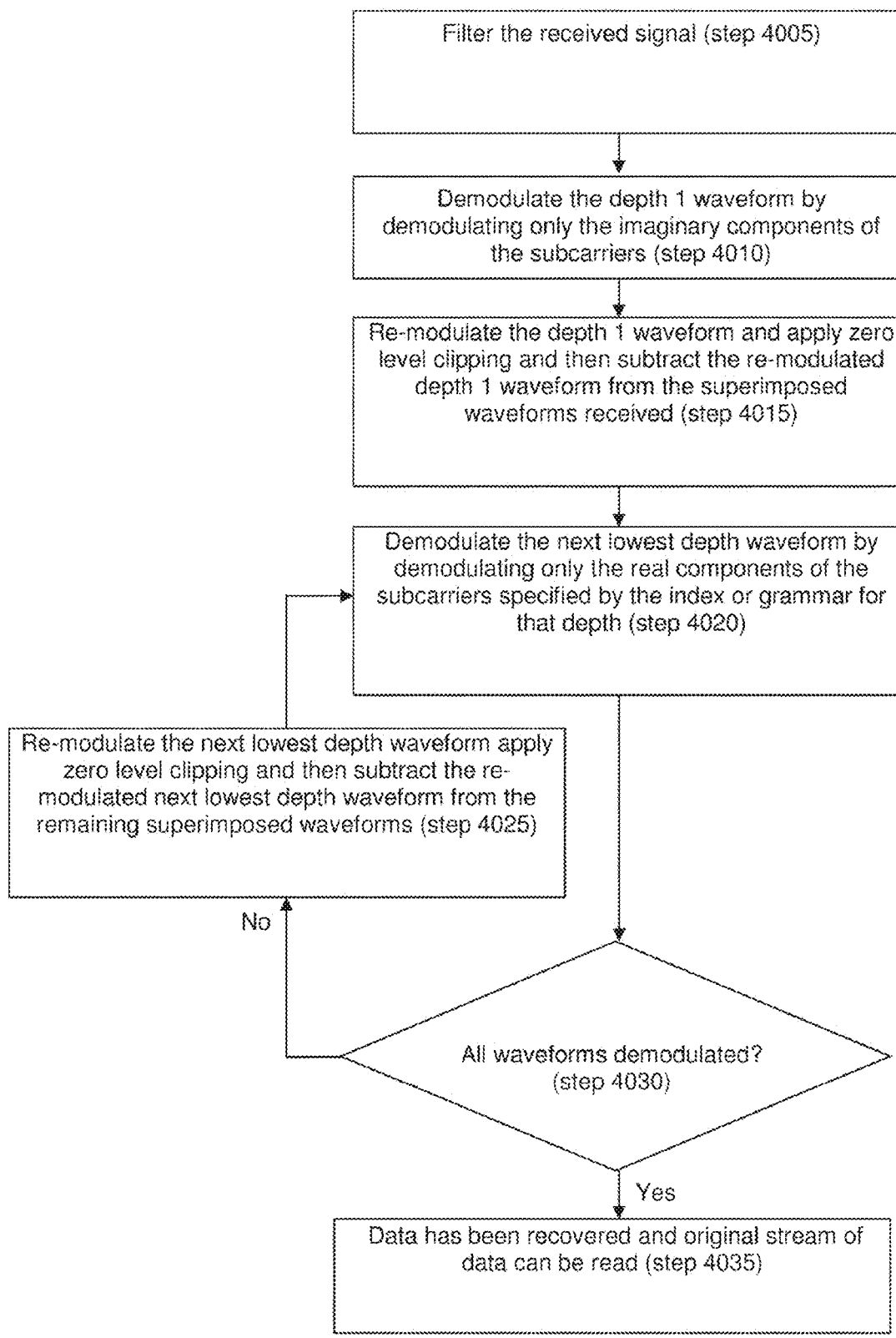
FIG. 4 is a flowchart of a method for re-constituting the bipolar signal from the transmitted signal prepared using the method shown in FIG. 3.
Figure 5:
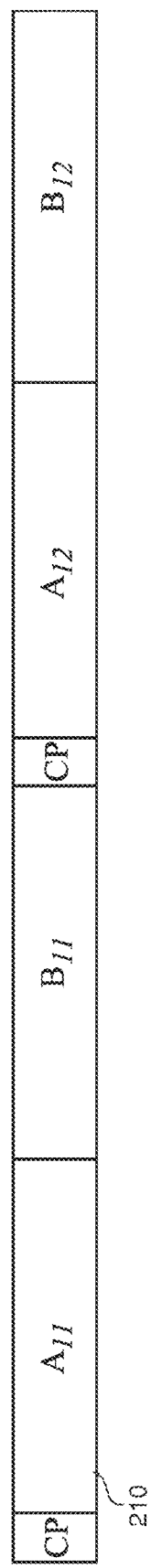
FIG. 5 is an illustration of a data frames of conventional PAM-DMT encoding scheme.

When the signal comprising the superimposed waveforms is received, the signal processor 70 at the receiver 20 is configured to recover the information content using the method illustrated in FIG. 4. The signal is filtered in step 4005.

The signal processor 70 at the receiver 20 is configured to recover the information content of depth 1 by considering only the imaginary components of the subcarriers (step 4010 in FIG. 4). This can be given as $\hat{B}_1[k]=2\Im(X_T[k])+W[k]$, where $W[k]$ is the frequency domain realization of the additive white Gaussian noise (AWGN) at the receiver. The information of depth 1 can then be remodulated at the receiver to obtain $\hat{x}_1[n]$, which can be subtracted from the received waveform, $x_T[n]$ (step 4015 in FIG. 4). This results in removal of the imaginary component of $X_T[n]$ and also in the removal of the real domain distortion caused by the zero level clipping of the depth 1 waveform, $FFT\{|x_1[n]|\}$.

Subsequent depths can be demodulated by selecting the appropriate frequency subcarrier indexes at each depth (step 4020). The real component of the subcarriers at $2^{d-2}(2k+1)$ for $k=0, 1, \ldots, N/2^d-1$ can then be remodulated to obtain the waveform at depth d, $\hat{x}_d[n]$, which would be subtracted from the remaining superimposed waveform (step 4025).

The same process is repeated until the information at the last depth is demodulated (step 4030). In this way the distortion of the previous depths is estimated and cancelled from the higher depths in this successive receiver process.

Once all of the waveforms at each depth have been demodulated, the data has been recovered and the original stream of data can be reformed (step 4035).

It will be appreciated that the first depth is similar to the spectral efficiency of classic PAM-DMT, which is also similar to that of DCO-OFDM.

Figure 7:
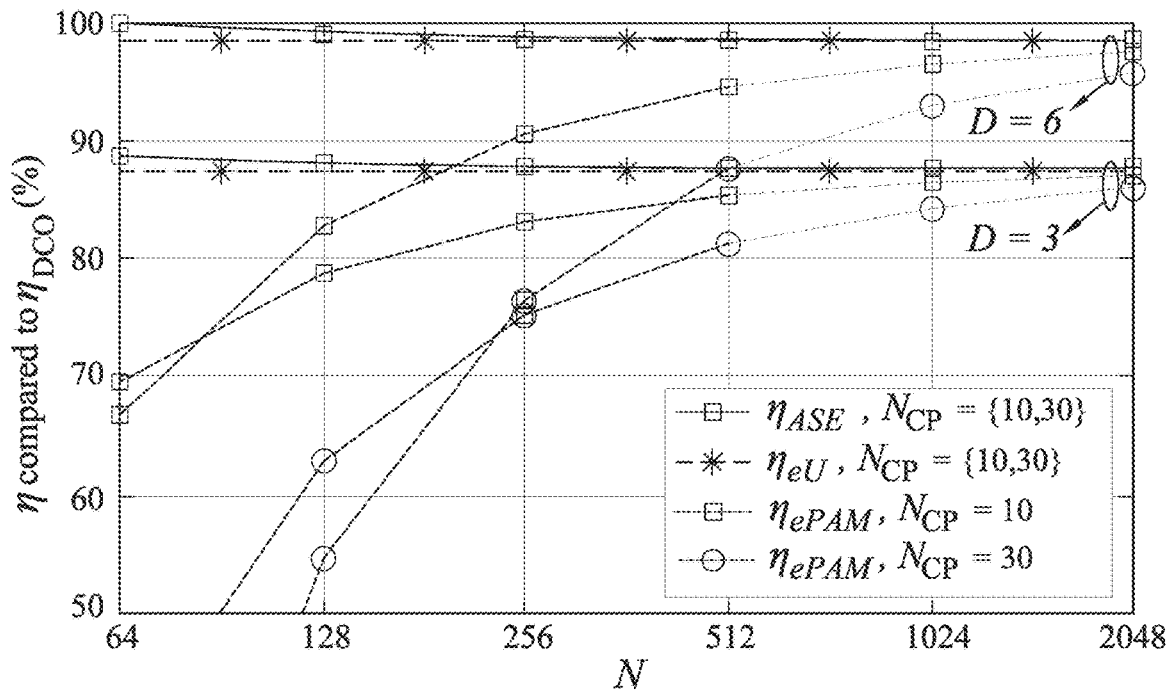
FIG. 7 is a graph showing the spectral efficiency of the method of FIGS. 3 and 4 (termed ASE-DMT), eU-OFDM and ePAM-DMT relative to DCO-OFDM for different FFT and CP lengths at D=3 and D=6.

A comparison of the spectral efficiencies of equivalent systems using the above method of the present invention ($\eta_{ASE}$), eU-OFDM ($\eta_{eU}$) (see WO2015/036786) and time domain modulated PAM-DMT, i.e. ePAM-DMT ($\eta_{ePAM}$) relative to DCO-OFDM is shown in FIG. 7. The method described in relation to FIGS. 3 and 4 is termed augmented spectral efficiency discrete multitone (ASE-DMT) by the inventors and indicated as such in the keys of FIGS. 7 to 12. Unlike ePAM-DMT (see e.g. M. Islim, D. Tsonev, and H. Haas, "Spectrally enhanced PAM-DMT for IM/DD optical wireless communications," in *Proceedings of IEEE Personal, Indoor, and Mobile Radio Communication*, (IEEE, 2015), pp. 877-882), the spectral efficiency of the present method is independent of the cyclic prefix length and therefore, can be employed with smaller FFT/IFFT sizes. It can be seen from FIG. 7 that when D=6 and N=64, the spectral efficiency of the present method exactly matches the spectral efficiency of DCO-OFDM.

Figure 8:
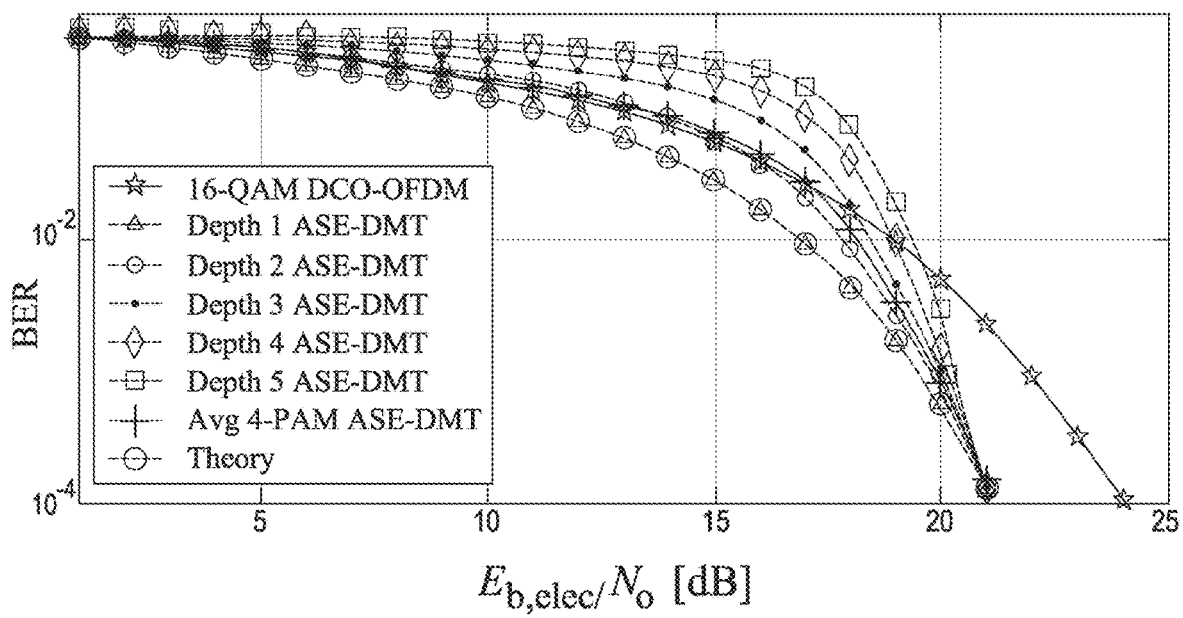
FIG. 8 is a graph showing the bit error rate (BER) performance of the depths of the method of FIGS. 3 and 4 (termed ASE-DMT), with 16-PAM, with a total number of depths D=5 and the BER of 16-QAM DCO-OFDM shown for comparison.

FIG. 8 shows the BER performance of 16-PAM depths of the present invention with a total number of depths D=5. The BER of 16-QAM DCO-OFDM is shown for comparison purposes. The analytical performance bound matches the BER performance of the first depth. The BER performance of other depths tends to be affected by the wrongly decoded bits at the lower order depths. Any incorrectly decoded bit at the lower order depths translates into further incorrect bits at higher order depths. However, at high SNR, the BER performance of all depths converges to match with the analytical performance of the present method. As shown in FIG. 8, the BER performance of the present invention using 4-PAM is more efficient, with a 3 dB gain relative to 16-QAM DCO-OFDM in terms of the electrical energy efficiency. The spectral efficiency ratio of the present invention to the spectral efficiency of DCO-OFDM is 97%.

Figure 9:
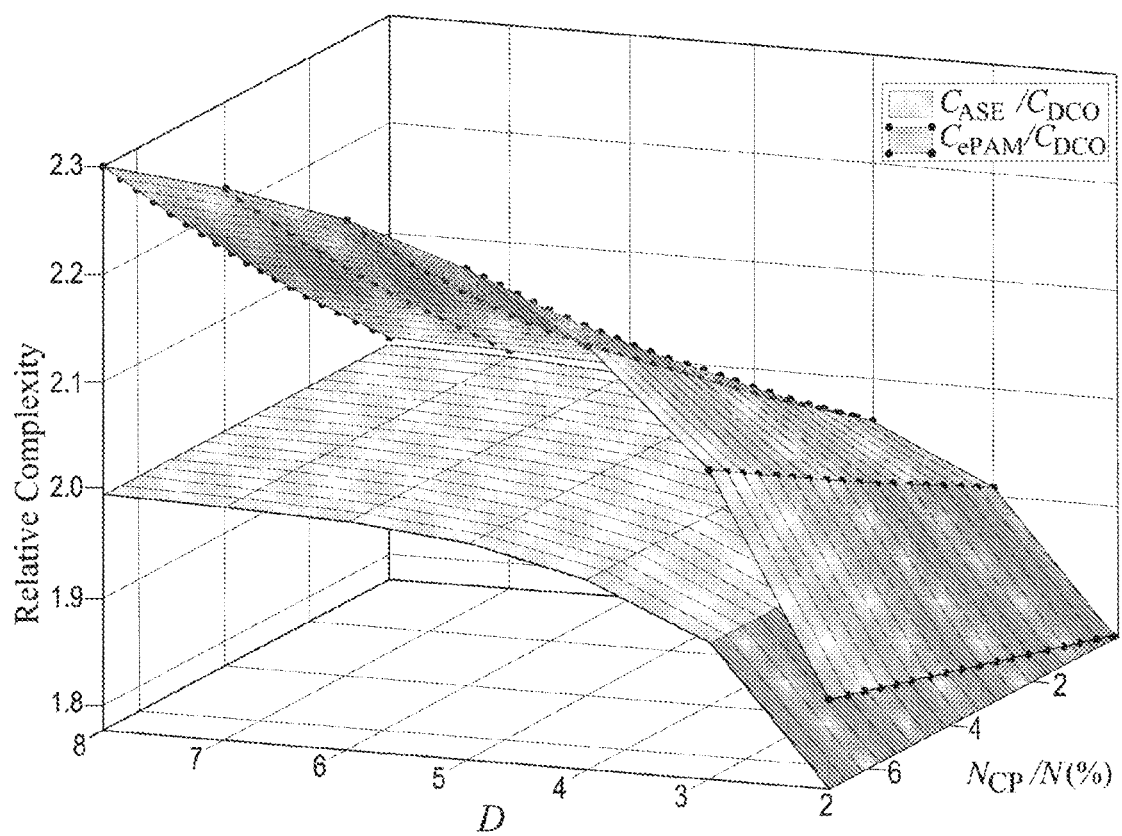
FIG. 9 is a plot showing the relative computation complexity of the method of FIGS. 3 and 4 (termed ASE-DMT), and ePAM-DMT in comparison with the computation complexity of DCO-OFDM as a function of the total number of depths D, and the cyclic prefix percentage of the frame size $N_{CP}/N$.

FIG. 9 shows the computation complexity of the present invention relative to the computation complexity of DCO-OFDM ($C_{ASE}/C_{DCO}$) compared to the computation complexity of ePAM-DMT (i.e. superimposing PAM-DMT streams in the time domain) relative to the computation complexity of DCO-OFDM ($C_{ePAM}/C_{DCO}$) as a function of the total number of depths D, and the cyclic prefix percentage of the frame size $N_{CP}/N$. The relative complexity of the present method is independent of the cyclic prefix and it increases as the total number of depths increases. However, it converges to twice the complexity of DCO-OFDM. By way of comparison, the relative complexity of ePAM-DMT increases as the cyclic prefix length increases and as the total number of depths increases. The relative complexity of ePAM-DMT has a lower bound that is equivalent to the relative complexity of the present method when the cyclic prefix length is zero. The cyclic prefix length is limited by the total number of depths used. However, it can be seen from FIG. 9, that aligning the symmetry of the M-PAM modulated DMT streams in the frequency domain in the manner described herein generally, and in some situations significantly, lowers computational complexity relative to ePAM-DMT in which the streams are distributed in the time domain.

In practical terms, if the information streams were distributed in the time domain (i.e. ePAM-DMT or in eU-OFDM), the transmission cannot be started unless $2^D-1$ PAM-DMT frames are available at the transmitter side. In addition, frames at higher order depths are required to be processed in the time domain to achieve the symmetry required for superposition modulation. This introduces additional delay at the transmitter side.

At the receiver side of ePAM-DMT or eU-OFDM, the demodulation of frames at depth-d can only happen after all lower depths have been demodulated and remodulated. This is estimated at $\sum_{d'=2}^{d} 2^{D-d'+1}$ PAM-DMT frames. Moreover, $2^D$ frames are required to be buffered at the receiver, until the demodulation process of a full ePAM-DMT frame finishes.

In contrast, there is no delay associated with the present transmitter 15, as all of the depths are generated at the same time. At the receiver side, the demodulation of frames at depth-d can only take place after all of the lower depths have been demodulated and remodulated. This is estimated at (d−1) M-PAM modulated DMT frames. Moreover, (d−1) frames are required to be buffered at the receiver, until the demodulation process of a full ASE-DMT frame finishes.

The spectral efficiency of each additional stream decreases exponentially. Therefore, it is more efficient to implement the present invention with a small number of depths, e.g. D=2, 3, 4 or 5. This would result in a small spectral efficiency gap between the present invention and DCO-OFDM. This spectral efficiency gap can be closed by the use of arbitrary constellation sizes described below.

Typical OFDM and/or DMT signals attain high peak-to-average power ratios (PAPRs). This drives the LEDs into non-linear regions because of their limited dynamic range. However, the higher order depths in ASE-DMT are sparse in the frequency domain. This reduces the PAPR of higher order depths. To exploit this property, the waveform at each depth can be used to drive a single LED in an LED array. This allows the waveforms to be superimposed in the optical domain and reduces the PAPR, and this will mitigate any non-linearity.

Figure 10:
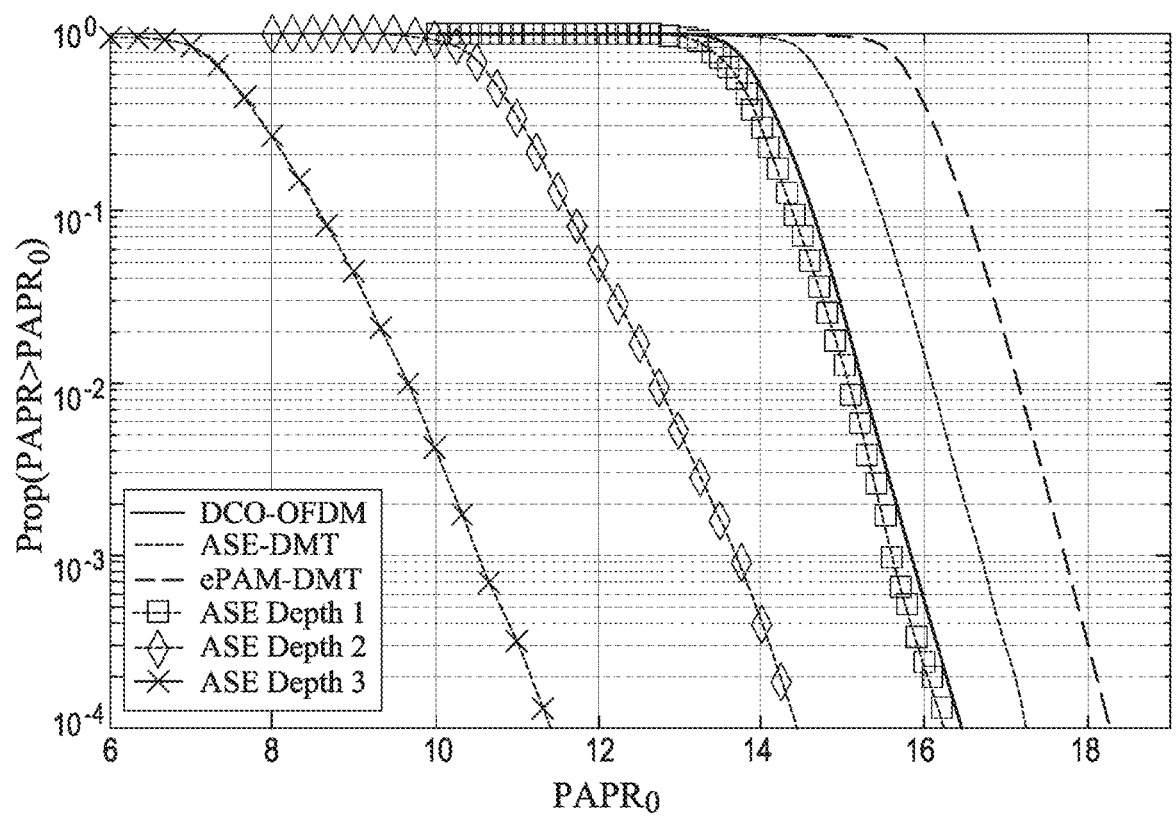
FIG. 10 is a plot illustrating the peak to average power ratio of the method of FIGS. 3 and 4 (for individual depths and overall), relative to ePAM-DMT and DCO-OFDM.
Figure 11:
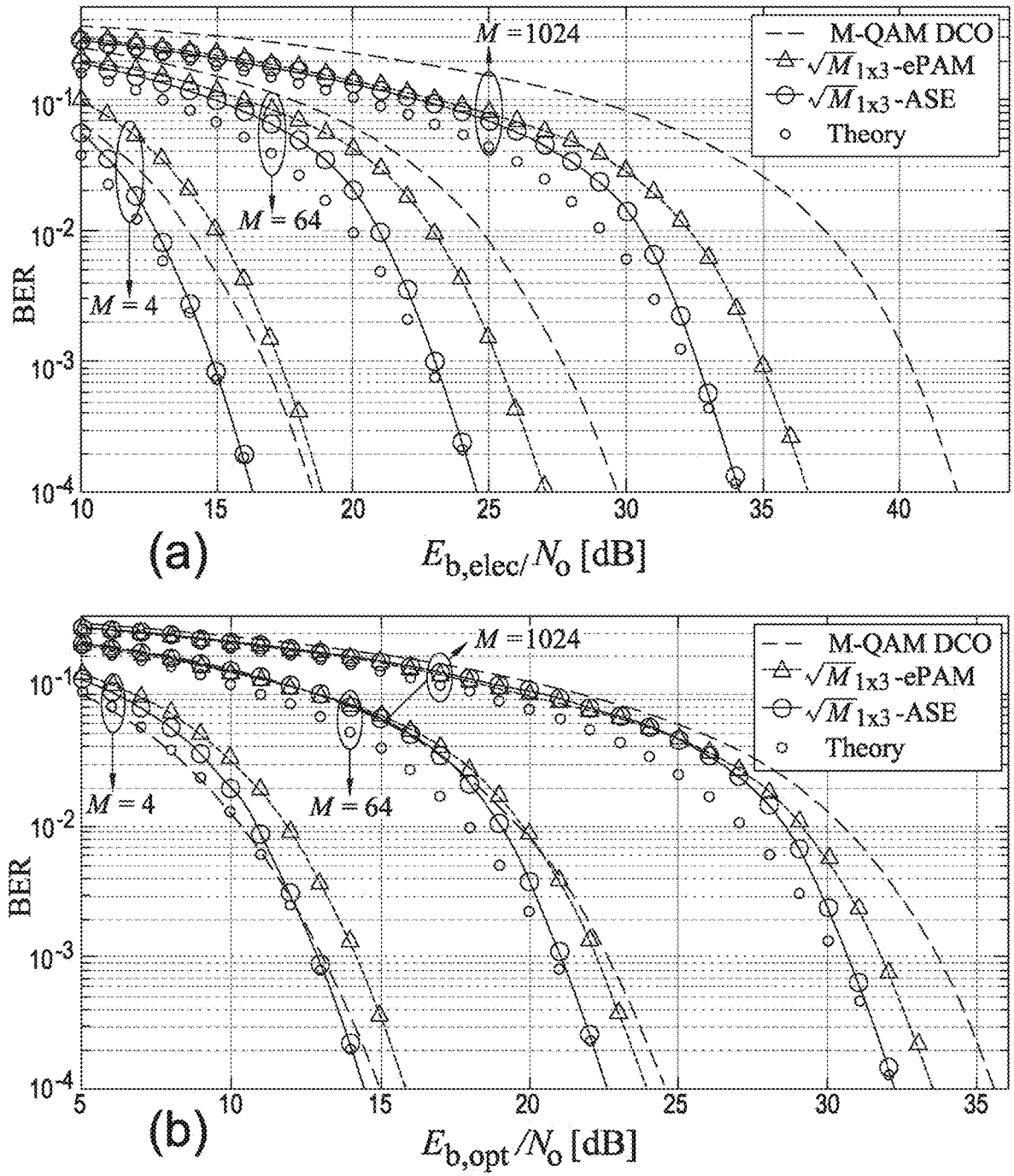
FIG. 11 plots showing the BER performance comparison of the method of FIGS. 3 and 4 relative to ePAM-DMT and DCO-OFDM for different spectral efficiencies in an AWGN channel as a function of: (a) electrical SNR, and (b) optical SNR.

The PAPR of the various depths is presented in FIG. 10 to illustrate the sparsity effect on the PAPR. The PAPR of various individual depths of the superimposed waveform increases as the depth order, d, increases. The PAPR of the overall waveform is shown to be higher than the PAPR of DCO-OFDM but lower than the PAPR of ePAM-DMT. The BER performance of the present invention is compared with the BER performance of ePAM-DMT and DCO-OFDM in an additive white Gaussian Noise (AWGN) channel. An ideal LED model is used. As such, the only nonlinear operation considered is the clipping at the zero level. The DC bias is defined to be a multiple of the standard deviation of the bipolar OFDM signal $k_{MDCOos}$.

FIGS. 11(a) and 11(b) are plots showing the BER performance comparison of the present invention (ASE-DMT), ePAM-DMT and DCO-OFDM for different spectral efficiencies in an AWGN channel as a function of: (a) electrical SNR, and (b) optical SNR. The DC biasing levels for DCO-OFDM at M={4,64,1024} are estimated through Monte Carlo simulations at respectively 6 dB, 9.5 dB, and 13 dB.

It can be seen from FIG. 11(a) that the present invention (ASE-DMT) is more energy efficient than ePAM-DMT and DCO-OFDM for all of the presented cases as a function of the electrical SNR. At different spectral efficiencies, the electrical energy savings of the present invention are between 2.24 dB and 8 dB when compared with DCO-OFDM, and almost constant at 2.5 dB when compared with ePAM-DMT at a BER of $10^{-4}$.

Similar trends are shown in FIG. 11(b) for the optical SNR. At different spectral efficiencies, the optical energy savings of the present invention are between 0.6 dB and 3.25 dB when compared with DCO-OFDM, and are almost constant at 1.3 dB when compared with ePAM-DMT at a BER of $10^{-4}$. The energy efficiency gains of the present invention over DCO-OFDM at different spectral efficiencies are summarized below in Table 1. It can be seen from this that the present invention is more efficient than ePAM-DMT in terms of both the electrical and optical SNR. This is due to the fact that, in ePAM-DMT, half of the frames are removed after each demodulation process. The frequency domain loading of M-PAM symbols in the present invention does not require this process, which results in a performance gain over ePAM-DMT. The theoretical BER bounds underestimate the BER at lower SNR due to the propagation errors in the successive streams cancellation process at the receiver. However, the theoretical BER bounds match the Monte-Carlo simulation results at high SNR values.

TABLE 1

Energy efficiency gains of over DCO-OFDM at a BER of $10^{-4}$.
Energy efficiency gains of ASE-DMT over DCO-OFDM at a BER of $10^{-4}$

| Spectral efficiency [bits/s/Hz] | Electrical energy gains [dB] | Optical energy gains [dB] |
| --- | --- | --- |
| 1 | 2.24 | 0.6 |
| 2 | 4 | 1.7 |
| 3 | 5 | 2 |
| 4 | 5.75 | 2.5 |
| 5 | 8 | 3.25 |

Arbitrary constellation sizes are used in embodiments of the present invention to close the remaining spectral efficiency gap with DCO-OFDM when a small number of depths is used. This allows the spectral efficiency of the present invention to be similar to the spectral efficiency of DCO-OFDM with only a few number of superimposed depths.

Arbitrary constellation sizes offer a practical solution for the present invention without any spectral efficiency loss. The computation complexity per bit associated with this approach is around 1.67 times higher than the computation complexity per bit of DCO-OFDM. Arbitrary constellation sizes would allow the spectral efficiency of the non-squared constellation sizes of M-QAM DCO-OFDM to be achieved. For example, to achieve the spectral efficiency of 8-QAM DCO-OFDM, it would be possible to use 4-PAM at the first depth, 2-PAM at the second depth, and 4-PAM at the third depth of the present invention. In order for the spectral efficiency of the present invention to match the spectral efficiency of DCO-OFDM, the combination of constellation sizes used should satisfy the following constraint:

$$\log_2(M_{DCO}) = 2 \sum_{d=1}^{D} \frac{\log_2(M_d)}{2^d}$$

D is the total number of depths, $M_d$ is the constellation size at depth d, d is the depth.

In addition, the power is allocated to each stream so that the average power of the modulation signal satisfies the following two constraints:

$$P_{Ele}^{avg}(D,\underline{\gamma}) \leq P_{Ele}^{avg}(D,1_{1 \times D})$$

$$P_{Opt}^{avg}(D,\underline{\gamma}) \leq P_{Opt}^{avg}(D,1_{1 \times D})$$

where $\gamma$ is the set of scaling factors at the modulation depths.

All possible combinations of constellation sizes at the different depths of the superimposed waveform with all possible power allocations were investigated by the present inventors for a maximum depth of D=3, where spectral efficiency in the range from 1 to 5 bits/s/Hz is achieved. The optimal configurations were obtained using Monte Carlo simulation comparisons of all the possible sets. The optimal configurations are presented in Table 2 below.

Figure 12:
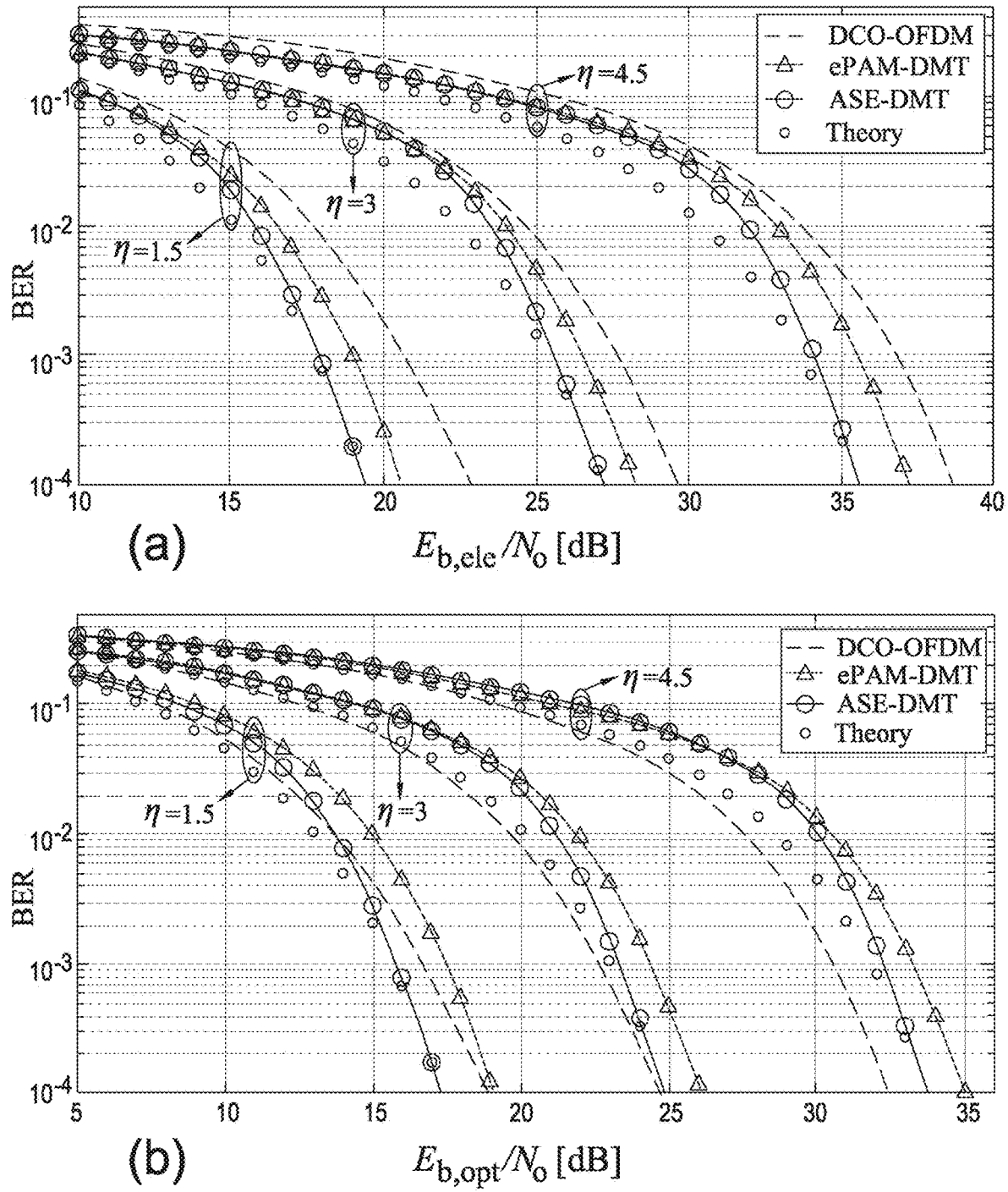
FIG. 12 plots showing the BER performance comparison of the method of FIGS. 3 and 4 relative to ePAM-DMT, and DCO-OFDM for different spectral efficiencies in an AWGN channel as a function of: (a) electrical SNR, and (b) optical SNR.

FIG. 12 shows a BER performance comparison of the present invention (ASE-DMT), ePAM-DMT, and DCO-OFDM for different spectral efficiencies in an AWGN channel as a function of: (a) electrical SNR, and (b) optical SNR. The spectral efficiency h is given in [bits/s/Hz]. The DC biasing levels for DCO-OFDM at h={1.5, 3, 4.5} are estimated through Monte Carlo simulations at respectively 7 dB, 9.5 dB, and 12 dB, as is known in the art.

Since the performance of $\sqrt{M}$–PAM is equivalent to the performance of M-QAM, the resolution of the possible constellation sizes at each depth is limited. The results of the BER performance comparison are outlined in Table 2 below. In comparison to results outlined in Table 1 (above), the approach of arbitrary constellation sizes reduces the electrical and energy gains. However, it increases the spectral efficiency at a reduced computation complexity. Therefore, a trade-off between the complexity and spectral and energy efficiencies has to be considered, depending on the application required.

TABLE 2

The optimal combination of constellation sizes and scaling factors for the present invention and the associated electrical and optical gains over DCO-OFDM at a BER of $10^{-4}$, where $M_d$ and $\gamma_d$ denote the constellation size and the scaling factor for the modulation depth-d, respectively.

| DCO-OFDM $M_{DCO}$-QAM | η [b/s/Hz] | ASE-DMT {$M_1, M_2, \ldots, M_D$}-PAM | γ[dB] | Energy gains [dB] Ele. | Opt. |
|---|---|---|---|---|---|
| 4-QAM | 1 | {2,2,4}-PAM | {1.9,2,−4.6} | 0.6 | −1 |
| 8-QAM | 1.5 | {4,2,4}-PAM | {−1.5,5,3,−1.2} | 3.15 | 1.05 |
| 16-QAM | 2 | {4,8,4}-PAM | {2.4,−3.4,2.5} | 2 | 0 |
| 32-QAM | 2.5 | {8,8,4}-PAM | {−0.9,−0.7,5.3} | 3 | 0.75 |
| 64-QAM | 3 | {16,8,4}-PAM | {−2.7,3.2,9.4} | 2.55 | −0.25 |
| 128-QAM | 3.5 | {16,16,16}-PAM | {0,0,0} | 3.28 | 0 |
| 256-QAM | 4 | {32,16,16}-PAM | {−2.3,6.3,7} | 3.36 | 0 |
| 512-QAM | 4.5 | {32,32,64}-PAM | {1,5,1.7,−4} | 3 | −1.4 |
| 1024-QAM | 5 | {64,32,64}-PAM | {−1.3,4.3,−1.1} | 4 | −0.5 |

In summary, the above invention provides an energy efficient superposition modulation scheme for intensity modulation and direct detection (IM/DD) OWC is proposed. The scheme is based on selective frequency domain loading of M-PAM symbols, so that multiple streams can be superimposed and transmitted with no inter-stream-interference. The selective frequency domain loading of subcarriers allows low latency and simplified implementation of superposition modulation for M-PAM Modulated DMT waveforms. The proposed scheme avoids the spectral and energy efficiency losses of ePAM-DMT.

By providing arbitrary constellation sizes, a simplified implementation with a reduced total number of depths can be achieved.

Although the above methods and apparatus are advantageously described in terms of an optical wireless communications system, it will be appreciated that the above techniques and principles are also applicable to other communications systems, such as microwave, radio frequency, or other electromagnetic or sonic communications techniques or any other communication system which might benefit from the use of unipolar signals.

In addition, it will be well understood by persons of ordinary skill in the art that whilst some embodiments may implement certain functionality by means of a computer program having computer-readable instructions that are executable to perform the method of the embodiments, the computer program functionality could be implemented in hardware (for example by means of a CPU or by one or more ASICs (application specific integrated circuits), FPGAs (field programmable gate arrays) or GPUs (graphic processing units)) or by a mix of hardware and software.

Furthermore, whilst the above describes transmitters and receivers, it will be appreciated that both transmitter and receivers may be provided in a single device, such as a mobile communications device, so that two way communications using the present system are possible.

As such, it should be understood that the embodiments described herein are merely exemplary and that various modifications may be made thereto without departing from the scope of the present invention.

The invention claimed is:

1. A processing system for a transmission apparatus configured to produce or generate a transmission signal representative of an original signal comprising data;
the data being carried by or comprised in waveforms or streams in the transmission signal;
the processing system being configured to generate the respective waveforms or streams by loading the data onto selected data symbols or subcarriers, the loading being performed in the frequency domain, the processing system being further configured to zero-level clip the generated waveforms or streams to form zero-level clipped waveforms or streams and superimpose the zero-level clipped waveforms or streams to form the transmission signal.

2. The processing system according to claim 1, configured to select the data-symbols or subcarriers used to form, or that are comprised in, each waveform or stream such that:
there is no intra- and/or inter-waveform or stream interference or clipping distortion; or
clipping distortion or interference due to at least one of the waveforms or streams on at least one or each other of the waveforms or streams does not adversely affect, and/or does not prohibit the reading and/or recovery of, the information carried by the at least one or each other of the waveforms or streams.

3. The processing system of claim 1, wherein the data symbols are M-ary pulse-amplitude modulation (M-PAM) symbols.

4. The processing system of claim 1, wherein each waveform or stream has a different data capacity.

5. The processing system according to claim 4, wherein a depth of the waveform or stream is inversely related to the data capacity of the stream.

6. The processing system of claim 1, wherein at least one of the respective waveforms or streams comprise a pulse amplitude modulated-discrete multi-tone (PAM-DMT) waveform or stream; and/or one or more of the respective waveforms or streams comprise M-PAM modulated DMT waveforms or streams.

7. The processing system of claim 6, wherein the respective waveforms or streams comprise a pulse amplitude modulated-discrete multi-tone (PAM-DMT) waveform or stream as a first waveform or stream and M-PAM modulated DMT waveforms or streams as the other waveforms or streams.

8. The processing system according to claim 1, wherein at least one of the waveforms or streams comprises or is comprised of symbols loaded only onto imaginary components of the sub-carriers.

9. The processing system according to claim 1, wherein one or more of the waveforms or streams comprise or are comprised of data symbols being loaded only onto real components of the sub-carriers.

10. The processing system according to claim 9, wherein one or more of the waveforms or streams are formed or comprised of different subcarriers or combinations of sub-carriers specified for each depth by an algorithm, index or grammar.

11. The processing system according to claim 10, wherein at least one or each of the waveforms or streams are formed by or comprise symbols being provided only on subcarriers k', where $k'=2^{d-2}(2k+1)$, where d is the depth of the waveform or stream >1, and k is $0, 1, \ldots, N/2^d-1$ (where N is the number of subcarriers).

12. The processing system according to claim 1, wherein the symbols encoded onto the subcarriers for at least one or each waveform or stream have Hermitian symmetry and/or anti-symmetry and/or symmetry.

13. The processing system according to claim 1, wherein the waveforms or streams are superimposed to form the transmission signal.

14. The processing system according to claim 1, wherein respective different streams or waveform are transmitted by respective different transmitter elements and/or transmission channels.

15. The processing system according to claim 1 configured to provide a constellation size for at least one or each of the waveforms or streams at one or more depths that is different to the constellation size of at least one or each other waveform or stream at one or more or each other depth.

16. The processing system of claim 15, configured to assign at least two or each waveform or stream or depth an arbitrary constellation size.

17. A transmission apparatus configured to produce, generate and/or transmit a transmission signal representative of an original signal comprising data;
the data being carried by or comprised in waveforms or streams in the transmission signal;
the transmission apparatus is configured to generate the respective waveforms or streams by loading the data onto selected data symbols and/or subcarriers, the loading being performed in the frequency domain to form the transmission signal; and
the transmission apparatus comprising at least one transmitter element and configured to transmit the transmission signal using the at least one transmitter element; and the transmission apparatus is configured to clip the waveforms or streams to form clipped waveforms or streams and superimpose the clipped waveforms or streams to form the transmission signal.

18. The transmission apparatus according to claim 17, comprising the processing system of claim 1 and configured to transmit the waveforms or streams generated by the processing system or a signal representative thereof.

19. The transmission apparatus according to claim 17, wherein the transmission apparatus is an optical transmission apparatus for optical wireless communications.

20. A receiver system for receiving a plurality of transmitted streams or waveforms from transmission apparatus according to claim 17, the receiving system being configured to convert at least one or each of the received waveforms or streams into data.

21. The receiver system of claim 20, wherein the receiver system is configured to determine, separate out, decouple, extract and/or demodulate the stream or waveform by processing or demodulating only the imaginary components of the subcarriers.

22. The receiver system of claim 20, wherein the receiver system is configured to re-modulate the stream or waveform from the demodulated stream or waveform and subtract or remove the re-modulated stream or waveform from the superimposed information streams or waveforms to obtain the remaining superimposed waveforms or streams without the original waveform or stream.

23. The receiver system according to claim 22, configured, for each stream or waveform to iteratively determine, separate out, decouple, extract and/or demodulate a lowest depth stream or waveform remaining in the superimposed streams or waveforms by processing or demodulating only the subcarriers associated with the lowest depth stream or waveform as indicated by the associated algorithm, index or grammar.

24. The receiver system according to claim 23, configured to re-modulate the demodulated stream or waveform and subtract or remove the re-modulated lowest depth stream or waveform from the superimposed streams or waveforms.

25. A communications system comprising a transmission apparatus according to claim 17 and a receiver system for receiving a plurality of transmitted streams or waveforms from the transmission apparatus, the receiving system being configured to convert at least one or each of the received waveforms or streams into data.

26. A transmission method comprising:
generating a transmission signal representative of an original signal comprising data, the data being carried by or comprised in waveforms or streams in the transmission signal, the respective waveforms or streams being generated by loading the data onto selected data symbols and/or subcarriers, the loading being performed in the frequency domain to form the transmission signal;
clipping the waveforms or streams to form clipped waveforms or streams;
superimposing the clipped waveforms or streams to form the transmission signal; and
transmitting the transmission signal.

27. A non-transitory computer readable medium comprising instructions that, when implemented by processing apparatus cause the processing apparatus to implement the method of claim 26.

* * * * *